(12) United States Patent
Nakahara et al.

(10) Patent No.: US 6,714,320 B1
(45) Date of Patent: Mar. 30, 2004

(54) IMAGE PROCESSOR AND COLOR IMAGE PROCESSOR

(75) Inventors: Nobuhiko Nakahara, Susono (JP); Hiroki Umezawa, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 826 days.

(21) Appl. No.: 09/593,482

(22) Filed: Jun. 14, 2000

(30) Foreign Application Priority Data

Jun. 14, 1999 (JP) ............................................ 11-166878
Apr. 25, 2000 (JP) ........................................ 2000-123969

(51) Int. Cl.[7] ........................ H04N 1/405; H04N 1/409; H04N 1/52; H04N 1/58
(52) U.S. Cl. .................... 358/3.13; 358/3.16; 358/3.19; 358/3.12; 358/3.26; 358/533; 358/535
(58) Field of Search .............................. 358/3.13, 3.16, 358/3.17, 3.18, 3.19, 3.2, 3.12, 3.06, 3.26, 533, 534, 535, 536; 382/270

(56) References Cited

U.S. PATENT DOCUMENTS 4,517,605 A  *  5/1985  Yokomizo .................. 358/3.13
4,698,691 A  * 10/1987  Suzuki et al. ................ 358/3.2
4,920,501 A     4/1990  Sullivan et al.
5,111,310 A     5/1992  Parker et al.
5,535,020 A     7/1996  Ulichney
5,815,286 A  *  9/1998  Matsuba et al. ........... 358/3.19
6,021,217 A  *  2/2000  Nakahara .................... 358/3.2

FOREIGN PATENT DOCUMENTS

JP         20002016802 A  *  1/2002  .......... H04N/1/405

OTHER PUBLICATIONS

Robert Ulichney; "The Void–and–Cluster Method For Dither Array Generation"; pp. 332–339; SPIE vol. 1913.

* cited by examiner

Primary Examiner—Scott Rogers
(74) Attorney, Agent, or Firm—Frishauf, Holtz, Goodman & Chick, P.C.

(57) ABSTRACT

Halftone processing section carries out a halftone processing using a dither threshold plane on which thresholds in a predetermined threshold range corresponding to the tone range of input image data are arranged, and provides halftone-processed image data. Image output section has intrinsic, basic tone characteristics and outputs an image corresponding to the halftone-processed image data provided from the halftone processing section. The dither threshold plane consists of a plurality of same unit threshold matrixes and each of the unit threshold matrix consists of a plurality of sub-matrixes. An array of relatively low thresholds in the predetermined threshold range is equal among the plural sub-matrixes, and relatively medium thresholds and high thresholds in the predetermined threshold range are arranged periodically to extend over series of sub-matrixes.

34 Claims, 29 Drawing Sheets

FIG. 7A

REFERENCE THRESHOLD

THRESHOLD PLANE

|   | 1 | 2 | 3 | 4 | 5 | 6 | 7 | 8 |
|---|---|---|---|---|---|---|---|---|
| 1 | 1 | 2 | 3 | 4 | 5 | 6 | 7 | 8 |
| 2 | 9 | 10 | 11 | 12 | 13 | 14 | 15 | 16 |
| 3 | 17 | 18 | 19 | 20 | 21 | 22 | 23 | 24 |
| 4 | 25 | 26 | 27 | 28 | 29 | 30 | 31 | 32 |
| 5 | 33 | 34 | 35 | 36 | 37 | 38 | 39 | 40 |
| 6 | 41 | 42 | 43 | 44 | 45 | 46 | 47 | 48 |
| 7 | 49 | 50 | 51 | 52 | 53 | 54 | 55 | 56 |

FIG. 7B

REFERENCE THRESHOLD

THRESHOLD PLANE

|   | 1 | 2 | 3 | 4 | 5 | 6 | 7 | 8 |
|---|---|---|---|---|---|---|---|---|
| 1 | 1 | 8 | 15 | 22 | 29 | 36 | 43 | 50 |
| 2 | 2 | 9 | 16 | 23 | 30 | 37 | 44 | 51 |
| 3 | 3 | 10 | 17 | 24 | 31 | 38 | 45 | 52 |
| 4 | 4 | 11 | 18 | 25 | 32 | 39 | 46 | 53 |
| 5 | 5 | 12 | 19 | 26 | 33 | 40 | 47 | 54 |
| 6 | 6 | 13 | 20 | 27 | 34 | 41 | 48 | 55 |
| 7 | 7 | 14 | 21 | 28 | 35 | 42 | 49 | 56 |

FIG. 7C

REFERENCE THRESHOLD

THRESHOLD PLANE

|   | 1 | 2 | 3 | 4 | 5 | 6 | 7 | 8 |
|---|---|---|---|---|---|---|---|---|
| 1 | 1 | 2 | 5 | 6 | 11 | 12 | 19 | 20 |
| 2 | 3 | 4 | 9 | 10 | 17 | 18 | 27 | 28 |
| 3 | 7 | 8 | 15 | 16 | 25 | 26 | 35 | 36 |
| 4 | 13 | 14 | 23 | 24 | 33 | 34 | 43 | 44 |
| 5 | 21 | 22 | 31 | 32 | 41 | 42 | 49 | 50 |
| 6 | 29 | 30 | 39 | 40 | 47 | 48 | 53 | 54 |
| 7 | 37 | 38 | 45 | 46 | 51 | 52 | 55 | 56 |

COMPLETION OF FIRST THRESHOLD PLANE

SECOND THRESHOLD PLANE PROCESSING

FIRST THRESHOLD PLANE PROCESSING

COMPLETION OF SECOND THRESHOLD PLANE

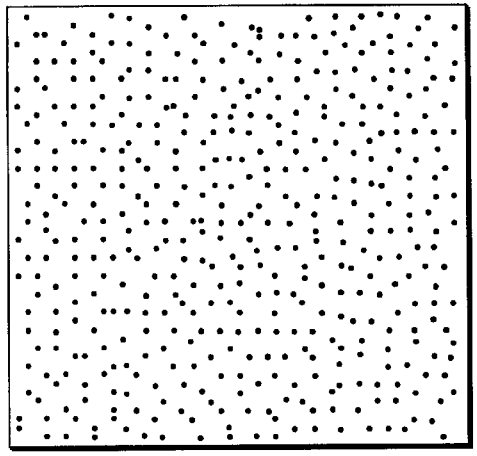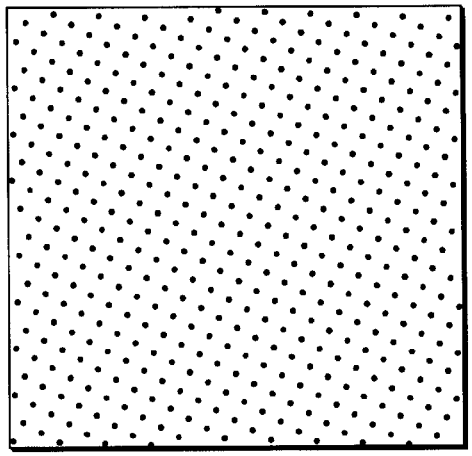
FIG. 10A　　　　　　　FIG. 10B
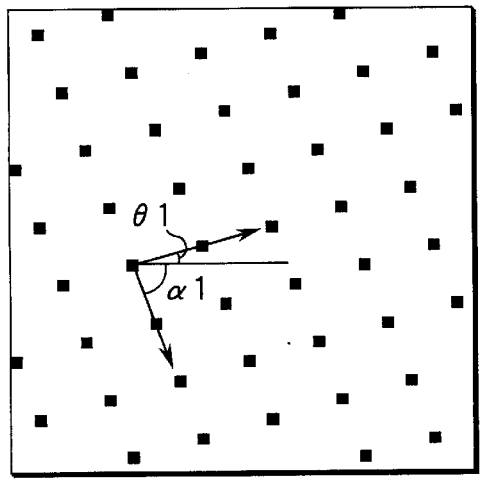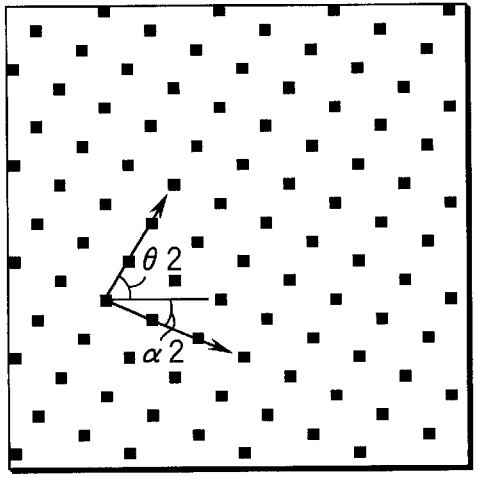
FIG. 11A　　　　　　　FIG. 11B $ki = kj$ ↑ SMALL $ki < kj$  COUPLING STRENGTH ↓ LARGE
$ki \ll kj$

ANISOTROPIC

NON-ANISOTROPIC

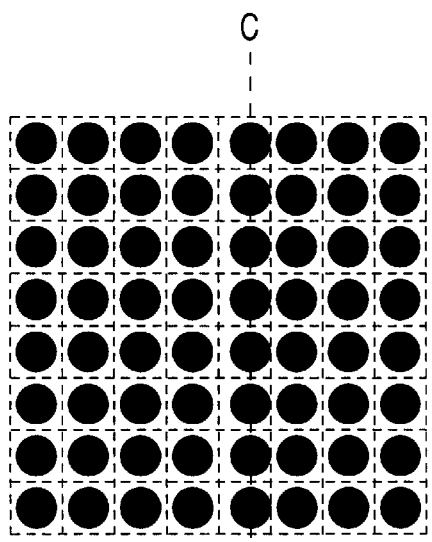
F I G. 27A
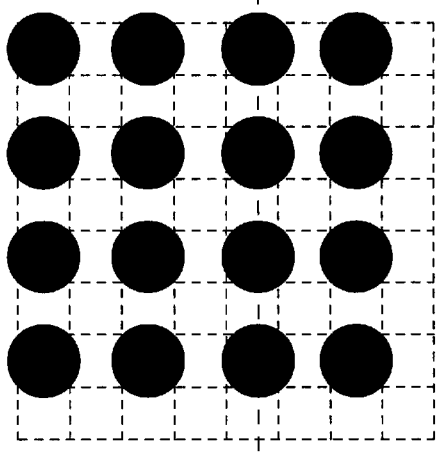
F I G. 27B
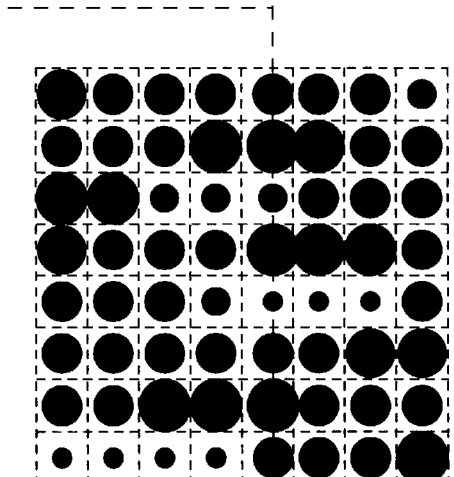
F I G. 27D
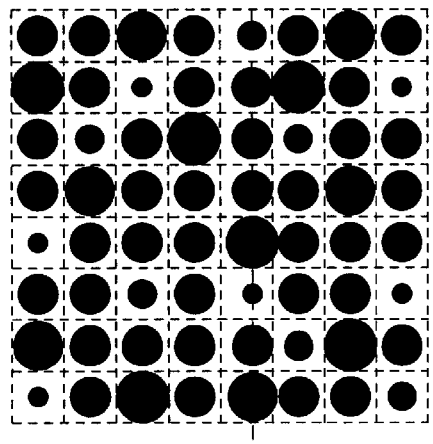
F I G. 27C

| INPUT VALUE | 0 | 1 | 2 | 3 | 4 | 5 | 6 | 7 |
|---|---|---|---|---|---|---|---|---|
| BEFORE γ CORRECTION | 0 | 4 | 4 | 4 | 4 | 4 | 4 | 4 |
| AFTER γ CORRECTION (ACTUAL NUMBER) | 0 | 0.6 | 1 | 1.5 | 2 | 2.8 | 3.8 | 5 |
| ON NUMBER (INTEGER) | 0 | 2 | 2 | 2 | 2 | 3 | 4 | 4 |

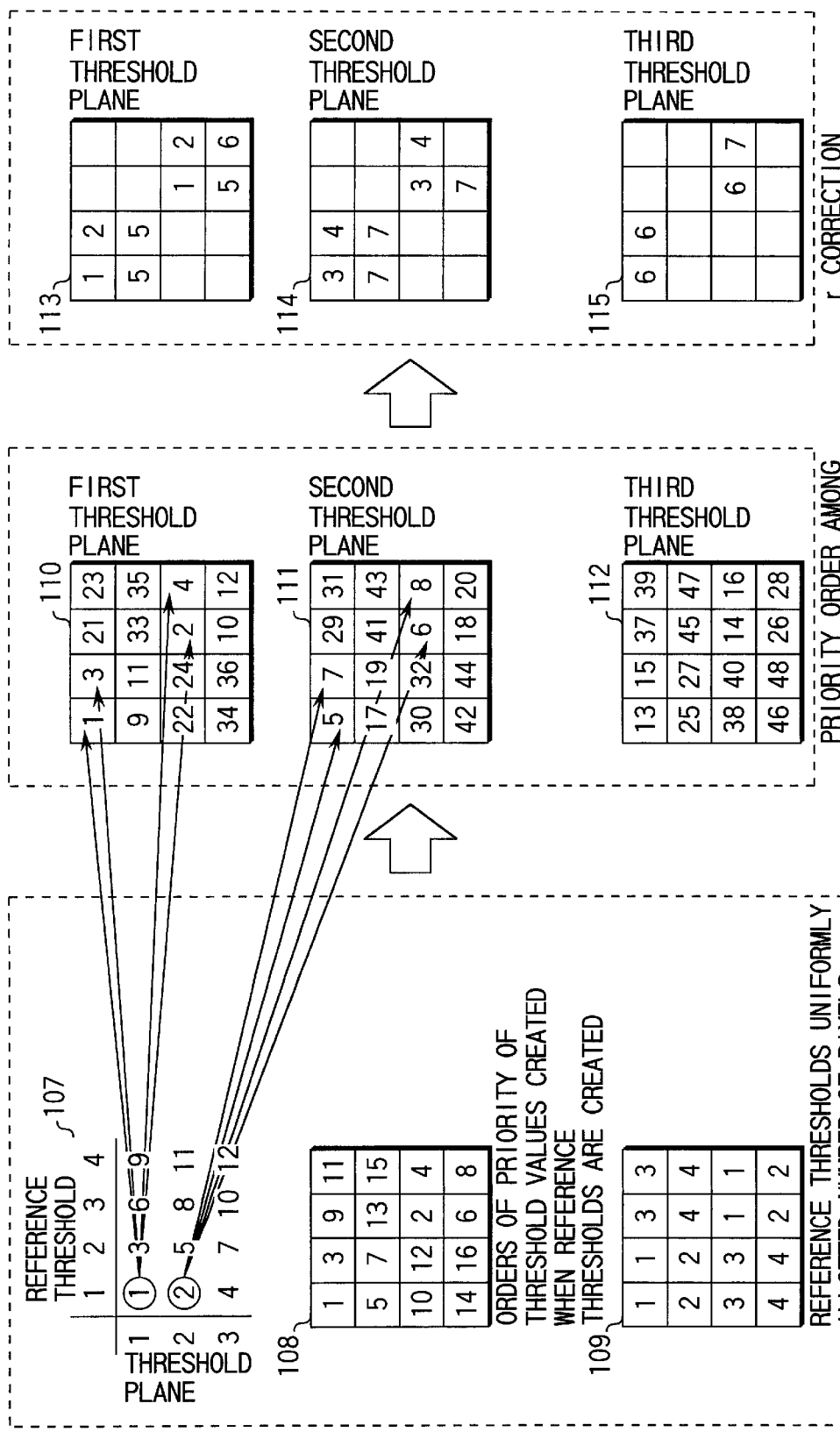

IMAGE PROCESSOR AND COLOR IMAGE PROCESSOR

CROSS-REFERENCE TO RELATED APPLICATIONS

This application is based upon and claims the benefit of priority from the prior Japanese Patent Applications No. 11-166878, filed Jun. 14, 1999; and No. 2000-123969, filed Apr. 25, 2000, the entire contents of which are incorporated herein by reference.

BACKGROUND OF THE INVENTION

The present invention relates to an image processor and a color image processor for dithering multi-tone-level input image data to convert the data into data of fewer tone levels, used in a printer, a copier, a facsimile machine, an MFP (Multi-Function Peripheral) and the like.

Conventionally, a binary image output printer employing a line head, such as a line LED (light emission diode) head, a line thermal head and a line ink jet head, forms a binary image by printing dots equal to the resolution of the head. Namely, if a line LED head is employed, dots having a size coincident with the distance between a plurality of recording elements (LED) linearly arranged in main scan direction are printed on a recording paper sheet to thereby print a binary image. If a thermal head is employed, dots having a size coincident with the distance between a plurality of recording elements (heating resistor) linearly arranged in main scan direction are printed on a recording paper sheet to thereby print a binary image. If an ink jet head is employed, dots having a size equal to the distance between recording elements (ink jet nozzles) linearly arranged in the main scanning direction are printed on a recording paper sheet to thereby print a binary image. It is also well known to shift the head slightly in the direction of the main scanning to form an image on the same paper sheet repeatedly and to thereby realize a higher resolution than that corresponding to the distance between the recording elements.

In the image forming apparatus provided with the recording head of this type, a character/line image is reproduced as a binary image simply corresponding to the resolution of the head. A graphic/photograph image is reproduced as a binary image by a halftone processing such as an ordered dither method or an error diffusion method. In the halftone processing, it is difficult to both maintain a high resolution and reproduce a high tone level. In case of the ordered dither processing using the same threshold matrix repeatedly, in particular, resolution and tone property are contradicting property. The halftone processing is also used for color characters, shading colors and the like.

Further, as the image forming apparatuses provided with a recording head as stated above, there is proposed one for modulating the printing area of one pixel (or adjusting dot size) based on multi-level image data converted by the multi-level dither processing, thereby allowing expressing one pixel with several tone levels. An example of a recording head constituted by a plurality of recording elements used for such an apparatus as well as the state of dots is shown in FIG. 33. In FIG. 33, reference symbol 1 denotes a recording head, 2 denotes an ink discharge port and 3 denotes an output dot (printed dot).

For brevity, FIG. 33 illustrates an example of the output of dots of the image forming apparatus capable for expressing one pixel with three levels including white (output 0). In addition, by arranging four or three lines of these recording elements in parallel, it is possible to record a color image of C (cyan), M (magenta), Y (yellow) and K (black) or a CMY-color image.

The image forming apparatus capable of printing such multi-level image data conducts various image processing including a color conversion processing, a UCR (under-color removal) processing and a gamma correction processing, to input RGB image data. Thereafter, the apparatus conducts a multi-level halftone processing such as a multi-level dither processing employing screen angles for the respective colors or a multi-level error diffusion processing so as to reproduce the number of tones intrinsic to a printer engine, to thereby obtain multi-level image data. The apparatus then outputs pixels having tone properties so as to enhance image reproducibility.

Generally, the ordered dither processing is relatively simple, has a high degree of freedom for configuration and has high processing speed, and the cost of the apparatus can be held down. However, it is said that the error diffusion processing is superior in image quality to the ordered dither processing. The ordered dither processing truncates quantization error in a comparison processing between input tone levels and thresholds, whereas the error diffusion processing diffuses quantization errors to peripheral pixels. Thus, they greatly differ in algorithm. As a result of the difference, compared with the ordered dither processing, the error diffusion processing can advantageously provide an output pattern having high frequency characteristics least conspicuous in light of human visibility, has a high edge holding effect and excellent image quality.

On the other hand, in a case of the halftone processing of a multi-level image output printer, it is known that the ordered dither processing and the error diffusion processing do not differ in image quality compared with the output of a binary image. This is because the truncated quantization error becomes far smaller than that of binary image data as the number of levels of the multi-level dither processing increases. In case of a high resolution printer, in particular, if the number of tones which one pixel can express is higher, the difference in image quality between the ordered dither processing and the error diffusion processing becomes less.

In addition, a method, such as a dither processing method employing fixed mask dither improved from stochastic dither or cluster dither, of realizing output characteristics comparable to that of the error diffusion processing at the same high speed as that of the ordered dither processing, is recently developed.

An ordinary binary output dither processing obtains binary output pixels by comparing input pixels with dither matrix thresholds at corresponding positions while basically, only taking into consideration a threshold array in a dither matrix on one plane. This state is shown in FIG. 34. FIG. 34 is a typical view showing a binary dither processing employing a well-known 4×4 Bayer dither matrix. To simplify description, input pixels of 4-bit tone level are compared with corresponding thresholds in a dither matrix. If the input tone level is equal to or higher than the corresponding threshold in the dither matrix, 1 (black) is output and if it is lower than the corresponding threshold, 0 (white) is output, thus obtaining a binary output image in combination of 1 and 0.

As shown in FIG. 34, the dither matrix has a configuration in which a unit dither threshold matrix of, for example, 4×4 (to be simply referred to as "unit matrix" hereinafter) is repeatedly used regularly and performs the above-described processing to all input pixels. Further, a normal output apparatus, such as a printer, often outputs a pixel similar to a circle rather than a square pixel due to the process limitations of the apparatus. The output state in this case is shown in FIG. 35. When all pixels are printed, the shapes of the printed pixels are designed to be ones completely covering ideal square pixels, i.e., circles with a diameter equal to or larger than √2 times as large as a resolution pitch like dot "1" shown in FIG. 35.

On the other hand, in the multi-level dither processing, it is necessary to consider not only a plane threshold array in the above-stated basic dither matrix but also depth (pixel level) direction. For example, in case of conducting a multi-level, e.g., N-level dither processing, (N−1) threshold planes are required. Dither thresholds on each of the threshold planes are compared with input tone levels, to thereby obtain an N-level output image. The state of this multi-level dither processing is shown in FIG. 36 and the state of output dots is shown in FIG. 37. FIGS. 36 and 37 show multi-level outputs including 0 (white).

Normally, in the dither processing, a high-quality image can be obtained if there is some sort of correlation among thresholds on a threshold plane and that among threshold planes. Accordingly, thresholds in (N−1) dither matrixes are often calculated automatically based on a reference threshold array indicating such correlation.

In-the multi-level dither processing taking account of this correlation among planes, there are roughly two sequences of threshold arrays extending over the respective planes as shown in FIGS. 38A and 38B. To simplify description, FIGS. 38A and 38B show a multi-level dither processing for converting input 8-bit image data into an image of four levels per pixel (2 bits) using a 2×2 reference threshold array. FIG. 38C shows the reference threshold array. This reference threshold array indicates the order of the magnitudes of thresholds arranged on a threshold plane.

The sequence shown in FIG. 38A is to determine thresholds sequentially from the first plane. For example, all thresholds on the first plane are determined and then those on the second plane are determined. In conducting a dither processing using such threshold planes, if tone level "100" is input, for example, a pixel at a position corresponding to "1" of FIG. 38C is judged to have a tone level 2, a pixel at a position corresponding to "2" is judged to have a tone level 1, a pixel at a position corresponding to "3" is judged to have a tone level 1 and a pixel at a position corresponding to "4" is judged to have a tone level 1.

This sequence is used in a printer such as an ink jet printer, which is basically less influenced by the appearance state, i.e., presence/absence of neighboring pixels or tone levels thereof and which can stably form an image out of independent pixels. The resolution of an image output using this sequence is very high and almost comparable to that of a printer engine. Thus, this sequence is ideal for reproducing an image by means of area modulation. However, if an input image has a uniform tone level, pixels of the same or similar size are easily filled to form an output image. Due to this, the image is susceptible to the print position accuracy or the printing accuracy, such as dot size accuracy, of the apparatus.

In the sequence shown in FIG. 38B, thresholds at corresponding positions on planes are sequentially determined from the first to the third planes. For example, thresholds at a position corresponding to "1" shown in FIG. 38C, i.e., "20" on the first plane, "39" on the second plane and "59" on the third plane are determined, and then thresholds on the first to third planes at positions corresponding to "2", shown in FIG. 38C are determined. In conducting a dither processing using these threshold planes, if tone level "100" is input, for example, a pixel at a position corresponding to "1" of FIG. 38C is judged to have tone level 3, a pixel at a position corresponding to "2" is judged to have a tone level 2, a pixel at a position corresponding to "3" is judged to have a tone level 0 and a pixel at a position corresponding to "4" is judged to have a tone level 0.

This sequence is used in a printer, such as a laser printer and a thermal printer, which tends to be influenced by the appearance state of neighboring pixels and for which it is difficult and unstable to form an image out of independent pixels. With this sequence, a printed image has low resolution and low dot concentration. If a dither threshold array is formed as a dot concentrate type array, i.e., formed such that a plurality of dots are printed in block, an image called a halftone-dot image is formed. This halftone-dot image represents an image having points orderly arranged like a mesh while the block of dots constitute one point. Since the printer of this type is low in resolution, minor print position error in units of pixels is inconspicuous.

In either of the above two examples, all the thresholds arranged on the respective planes are automatically calculated when the reference threshold array and the threshold sequence among planes in depth direction are defined.

Furthermore, as for the formation of a color image, the tone reproduction characteristic comparable to the quality of a photograph including a highlight is becomes increasingly important in recent color printers. The reproduction of tones capable of further enhancing graininess is one of the most important technical challenges among others. Graininess indicates the inconspicuousness of dots or rough feeling in a printed image. A good graininess image indicates an image which tones change uniformly or smoothly and a bad graininess image indicates an image having conspicuous dots or roughness.

As a technique for satisfying the graininess, there is proposed a method of enhancing the graininess of a highlight using thin ink colors, e.g., light cyan and light magenta beside standard four ink colors of C (cyan), M (magenta), Y (yellow) and K (black). With this method, however, the number of recording heads and driving mechanisms increase proportionately to the number of added ink colors. If a recording head has the same number of nozzles as that of pixels on a line per color, this disadvantageously leads to cost hike.

Moreover, color printing is faced by a problem of the unevenness of colors due to slight difference in the overlapping manner of the respective colors of C, M, Y and K. As for the four color printing of C, M, Y and K, various multi-level dither methods including a halftone dot dither method employing screen angles, dispersion dither methods represented by a Bayer dither method, a cluster dither method having intermediate characteristics between that of the dispersion dither method and the Bayer dither method and the like, have been developed.

Color image printing has further a problem of unevenness of colors caused by the subtle difference in the overlapping manner of the dots of the respective colors of C, M, Y and K. For example, if the halftone dot method employing screen angles is applied to dithering, colors interfere with one another to thereby cause moire such as roseate moire. If a dispersion dither matrix such as a conventional Bayer matrix is employed, conspicuous texture appears at a specific tone part due to the low degree of freedom for the arrangement of dots. As can be seen, many problems still remain unsolved before obtaining optimum output characteristics over the entire colors or tones.

These problems with dither processing occur to both a binary output printer and a multi-level output printer employing a dither matrix. While the problems are particularly serious in the dither processing of the threshold sequence shown in FIG. 38B, they are not completely solved in the dither processing of the threshold sequence shown in FIG. 38A, either.

Additionally, while this is common to all these ordered dither processing including a cluster dither processing, periodicity tends to be easily seen over the entire tone ranges of input image data. The periodicity is particularly conspicuous in a printer with relatively low resolution.

Recently, a processing method of realizing output characteristics comparable to that of the error diffusion processing at as high speed as that of the ordered dither processing by employing fixed mask dither improved from the stochastic dither or cluster dither, is being developed. One preferred example of this method is described in Robert Unichney, "The Void-and-Cluster Method for Dither Array Generation", SPIE/IS&T Symposium on Electronic Imaging Science and Technology, San Jose, Calif. February 1993. This processing method, however, assumes only theoretical output characteristics in an ideal system and it considers the dot overlapping model of a binary printer, i.e., the manner in which neighboring dots overlap with one another at best. According to this processing method, therefore, only the improvement of output characteristics can be expected.

Even an output apparatus capable of reproducing multiple levels does not always obtain optimum output results for all tone levels of an input image. If limited to a specific tone, a conventional, well-known dither processing can obtain more visually satisfactory results than a processing which employs any other improved stochastic dither pattern.

BRIEF SUMMARY OF THE INVENTION

It is an object of the present invention to improve the graininess and tone reproduction characteristics of an image outputted by an image processor and a color image processor.

The thresholds of a dither threshold plane are determined in view of the intrinsic output characteristics and the like of a binary output apparatus and a multi-level output apparatus.

According to one aspect of the invention, there is provided an image processor for converting input image data having the first number of tones into image data having the second number of tones lower than the first number by a halftone processing and for outputting an image corresponding to the image data, the image processor comprising: halftone processing means for carrying out the halftone processing using a dither threshold plane, thresholds in a predetermined threshold range corresponding to a tone range of the input image data arranged on the dither threshold plane; and image output means having intrinsic, basic tone characteristics, for outputting an image corresponding to the halftone-processed image data provided from the halftone processing means. The dither threshold plane consists of a plurality of same unit threshold matrixes, each of the unit threshold matrix consists of a plurality of sub-matrixes, an array of relatively low thresholds in the predetermined threshold range is equal among the plurality of sub-matrixes, and relatively medium thresholds and high thresholds in the predetermined range are arranged aperiodically to extend over series of sub-matrixes.

As a result, in the low tone area of an output image, low tone level (small diameter) dots are orderly outputted in a period of sub-matrix size. The graininess of the low tone parts is, therefore, improved.

According to other aspect of the invention, there is provided an image processor for converting input image data having the first number of tones into image data having the second number of tones by a halftone processing and for outputting an image corresponding to the image data, the image processor comprising: halftone processing means for carrying out the halftone processing using a plurality of dither threshold planes, thresholds in a predetermined threshold range corresponding to a tone range of the input image data are arranged on the plurality of dither threshold planes, each of the plurality of dither threshold planes including a plurality of same unit threshold matrixes; and image output means having intrinsic, basic tone characteristics and outputting an image corresponding to the halftone-processed image data provided from the halftone processing means. Each of the unit threshold matrixes consists of a plurality of sub-matrixes on not less than one dither threshold plane, an array of relatively low thresholds in the predetermined threshold range is equal among the plurality of sub-matrixes, and relatively medium to high thresholds in the predetermined threshold range are arranged aperiodically to extend over series of sub-matrixes. That is, the series of low thresholds are arranged to extend over some threshold planes according to the basic tone characteristics and arranged in a periodic and dispersed manner on the respective planes.

If the low tone region is printed by a printer having inferior tone characteristics in the low tone area, such a region is printed with dots of, for example, all tone level 1. However, according to the present invention, such a region is expressed with a concentration of dots of, for example, tone level 2. As a result, tone reproduction characteristics is improved. In that case, if the diameter of dots of the tone level 2 is sufficiently small, graininess is improved, as well.

Further, according to the invention, there is provided an image processor for converting color input image data having the first number of tones into color image data having the second number of tones by a halftone processing and for outputting a color image corresponding to the image data, the image processor comprising: halftone processing means for carrying out the halftone processing using a plurality of dither threshold planes for each color, each of the plurality of dither threshold planes including a plurality of same unit threshold matrixes; and image output means having intrinsic, basic tone characteristics, for outputting a color image corresponding to the halftone-processed image data provided from the halftone processing means. Each of the unit threshold matrixes consists of a plurality of sub-matrixes for not less than one dither threshold plane having at least two color components, an array of relatively low thresholds in the predetermined threshold range corresponding to a tone range of the input image data is equal among the plurality of sub-matrixes, and relatively medium to high thresholds in the predetermined threshold range are arranged aperiodically to extend over series of sub-matrixes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A to 7C show examples of sequences of threshold planes;

FIGS. 10A and 10B shows a dot pattern dispersed at random in a low tone part and an ordered dither dot pattern dispersed orderly, respectively;

FIGS. 11A and 11B show examples of the change of angle in the dispersion type ordered dither output pattern;

FIGS. 23A and 23B show modified examples of the threshold sequence shown in FIG. 22;

FIG. 24 shows another example of the threshold sequence of the present invention;

FIGS. 25A and 25B show other examples of the threshold sequence of the present invention;

FIGS. 27A to 27D show various output patterns including printing position error;

FIGS. 31A to 31C show orders of priority among the entire threshold planes and arrangement states of gamma-corrected thresholds in the embodiment;

DETAILED DESCRIPTION OF THE INVENTION

Description will be given hereinafter to embodiments in which the present invention is applied to a color ink jet printer, with reference to the accompanying drawings.

Figure 1:
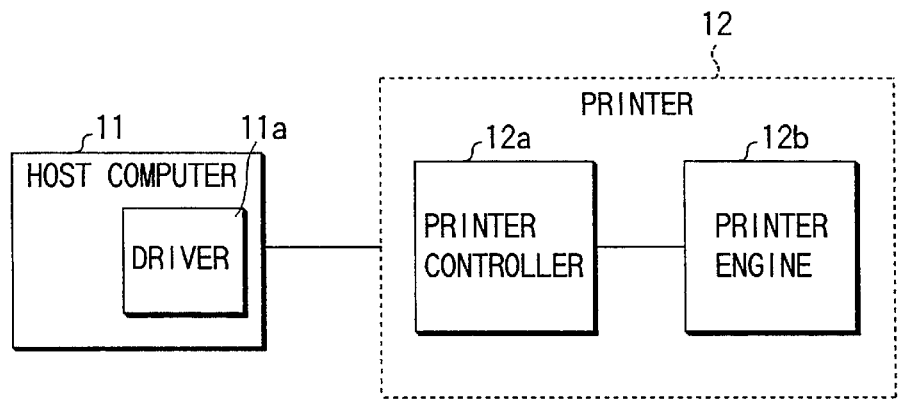
FIG. 1 is a schematic block diagram showing the hardware configuration of a printer to which the present invention is applied.

FIG. 1 is a block diagram showing the overall hardware configuration of the present apparatus. Color image data of M tones per pixel is transferred from a host computer 11 to a printer 12. Namely, the host computer 11 transfers encoded image data (or raster data) from a driver 11a to a printer controller 12a of the printer 12.

The printer controller 12a decodes the encoded image data, e.g., a page description language such as PDL, transferred from the host computer 11, to bitmap data and conducts various image processing before storing the processed data in an image memory included therein. The printer controller 12a transfers the image data processed by the printer engine 12b and controls the printing operation of the printer engine 12b.

The printer engine 12b converts the bitmap image data processed by the printer controller 12a into a drive signal to thereby drive a color ink jet head and, at the same time, carries a paper sheet to print the image on the sheet.

It is noted that the host computer 11 and the printer 12 do not necessarily have one-by-one relationship. If the printer 12 is used as a network printer in a network recently spread, a plurality of host computers 11 are prepared for a single printer 12.

Figure 2:
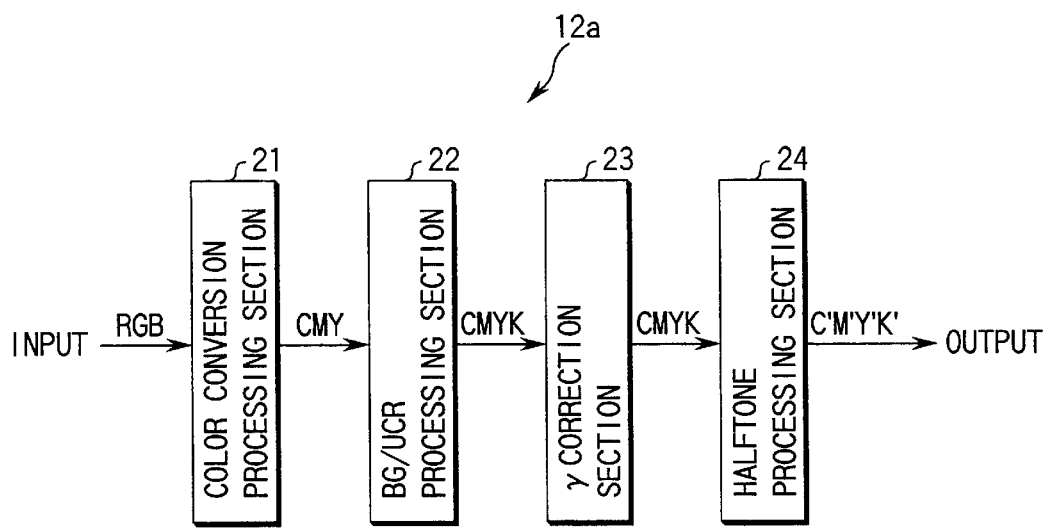
FIG. 2 is a schematic block diagram showing the configuration of an image processing section provided in a printer controller shown in FIG. 1.

FIG. 2 is a block diagram showing an example of the configuration of an image processing section in the printer controller 12a. This image processing section consists of a color conversion processing section 21, a BG/UCR processing section 22, a gamma (γ) correction section 23 and a halftone processing section 24. The color conversion processing section 21 converts an input standard RGB-color signal having colors each represented by 8 bits into CMY colors for reproducing printer colors and supplies the CMY colors to the BG/UCR processing section 22. R, G and B denote red, green and blue, respectively and C, M and Y denote cyan, magenta and yellow, respectively.

The BG/UCR processing section 22 extracts a black component from CMY colors, determines CMY colors after extraction and supplies CMYK-color data to the gamma correction section 23. Symbol K denotes black.

The gamma correction section 23 corrects the densities of the CMYK colors according to the actual output characteristics of the printer and supplies the densities-corrected CMYK colors to the halftone processing section 24. The halftone processing section 24 subjects data of respective pixels to a multi-level dither processing for respective colors to thereby convert the pixel data into multi-level image data of lower tone level of about 2 to 4 bits for the respective colors so as to conform to the printing capability of the printer 12.

Figure 3:
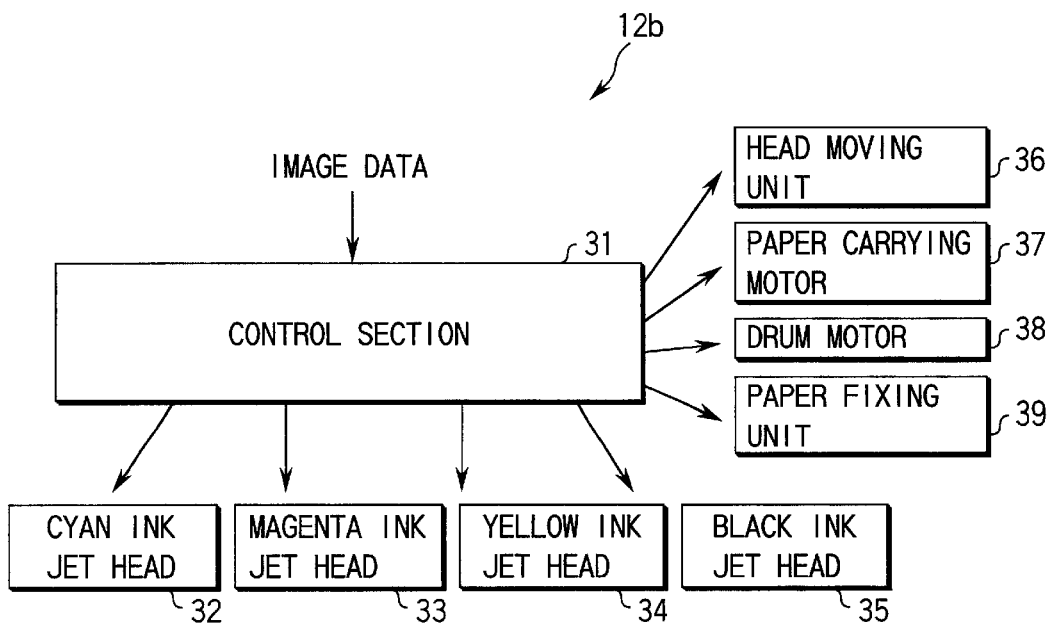
FIG. 3 is a schematic block diagram showing the configuration of a printer engine shown in FIG. 1.

FIG. 3 is a block diagram showing the hardware configuration of the printer engine 12b. A control section 31 drive-controls a cyan ink jet head 32, a magenta ink jet head 33, a yellow ink jet head 34 and a black ink jet head 35 based on multi-level image data of colors each represented by several bits from the printer controller 12a. The control section 32 also drive-controls a head moving unit 36 controlling the reciprocation of the respective heads 32 to 35 in the rotary shaft direction of a rotary drum, a paper carrying motor 37 carrying a sheet of printing paper to the rotary drum, a drum motor 38 rotating the rotary drum, and a paper fixing unit 39 provided with a charging roller for charging and fixing the printing paper wound around the rotary drum.

The printer engine 12b is provided with a reciprocation mechanism on which the heads 32 to 35 are mounted in the rotary shaft direction of the rotary drum. The printing paper carried by the paper carrying motor 37 is wound around the rotary drum and charged and fixed by the paper fixing unit 39. Thereafter, the drum motor 38 rotates the rotary drum. The respective ink jet heads 32 to 35 are driven based on printing data. When the rotary drum rotates once, the head moving unit 36 drives the reciprocation mechanism and the ink jet heads 32 to 35 are driven in the rotary shaft direction of the rotary drum by a half of the distance between ink discharge ports. When the ink jet heads 32 to 35 are driven based on the printing data and the rotary drum rotates twice, printing operation to one printing paper is completed. Thus, an image can be printed on the printing paper with a resolution twice as high as that corresponding to the ink discharge interval of the ink jet heads 32 to 35.

The halftone processing section 24 constitutes the important parts of the present invention. In this embodiment, description will be given to a case where the halftone processing section 24 conducts a halftone processing to input tone image data of, for example, 8 bits and 256 tones (0: white, 255: black) to convert the image data into data having colors each represented by 3 bits and 8 tones (0: white, 7: black). It is noted that the numbers of input and output tones should not be limited to the above numbers. It would be easily construed from the following description that the number of tones can be changed to arbitrary one.

Figure 4:
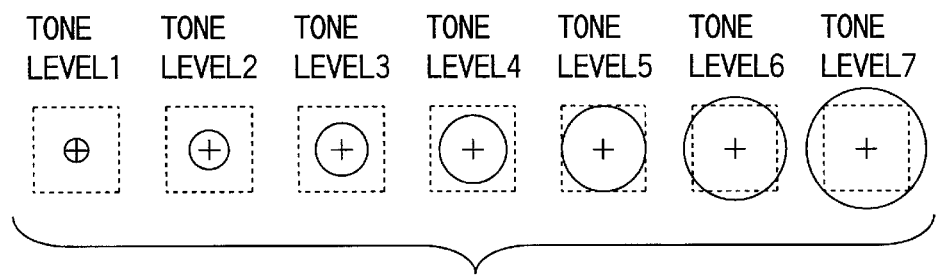
FIG. 4 shows dots sizes relative to respective tone levels.

The printer 12 outputs image data of colors each represented by 3 bits by conducting thereto a halftone processing. Namely, using seven types of variable dot sizes per pixel, eight tone levels including white can be reproduced within one pixel. FIG. 4 shows dot sizes for the respective tones levels, which are referred to as basic 8 tone characteristics.

While it is normally desirable that dot sizes are adjusted according to the respective tone levels, it is almost impossible to completely adjust them because of process restrictions. As for the ink jet printer, for example, it is relatively easier to make the discharge volume of each ink drop linearly proportionate to the image data than to linearly realize the brightness and density thereof with respect to input image data.

Further, it is also possible to attain target characteristics by adjusting the number of ink drops and drive waveforms corresponding to the respective tone levels. In this case, however, the drive waveforms tend to be complicated and cause redundant processing. Even if the basic 8 tone characteristics are adjusted to the target characteristics, it is unavoidable that output characteristics are shifted from a targeted, ideal tone curve while all of the 256 tones are reproduced by means of a halftone processing. Besides, these characteristics are greatly influenced by even the slight difference of the characteristics of paper to be used.

Accordingly, it is the easiest method to provide a configuration as simple as possible to the extent that tone characteristics are not largely distorted in a design and to correct the printing characteristics of the printer engine by conducting gamma correction and the like. If adopting this method, the dot size of at least the highest tone is that of a circle with a diameter large enough to completely cover a square pixel corresponding to the resolution of the printer engine.

Figures 5, 6:
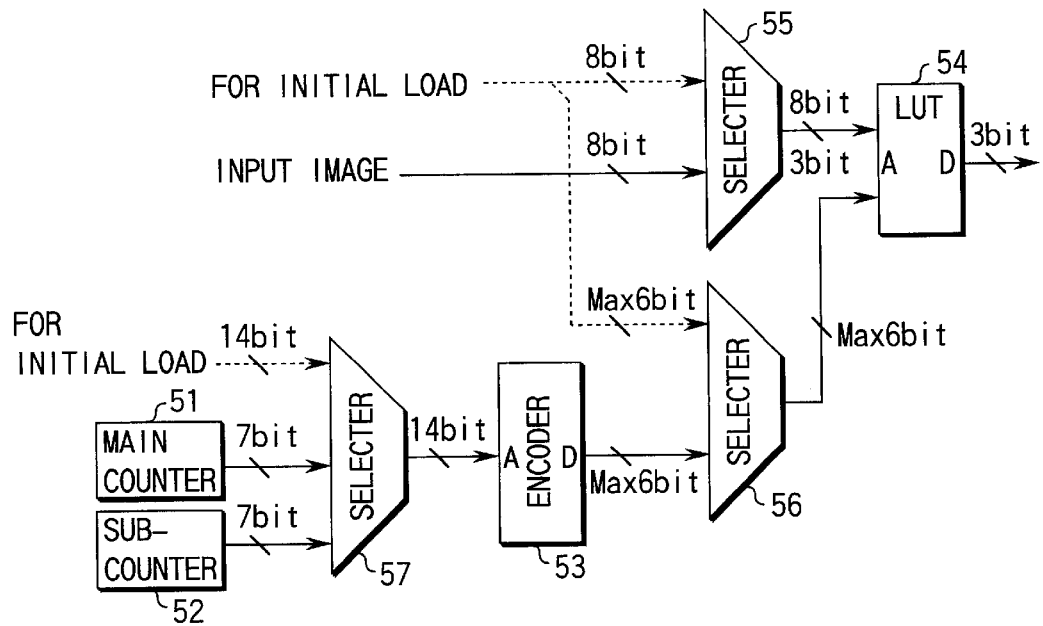
FIG. 5 is a block diagram showing the configuration of a halftone processing section shown in FIG. 3.
FIG. 6 shows a reference threshold array.

The halftone processing section 24 conducts a multi-level dither processing. The basic hardware configuration of the halftone processing section 24 is shown in FIG. 5. It is noted that the configuration of the section to realize the multi-level dither processing may be basically, freely chosen and that that shown in FIG. 5 is only one example.

A main counter 51 generates a main scan direction address of a unit matrix which has a size of, for example, 128. A sub-counter 52 generates a sub-scan direction address of a unit matrix which has a size of, for example, 128.

A selector 57 supplies thresholds in a reference threshold array to an encoder 53 when, for example, power is turned on. During the dither processing, the selector 57 supplies the count values of the main counter 51 and the sub-counter 52 to the encoder 53.

The encoder 53 outputs values (maximum 6 bits) corresponding to positions indicated by the counter values input from the main counter 51 and the sub-counter 52 based on the reference threshold array. Here, the reason the output of the encoder 53 needs to be 6 bits will be described. If input image data of 8 bits and 256 tones is converted to data of 3 bits and 8 tones by a halftone processing, the number of planes used is (8-1) or seven. If the largest number of thresholds used per plane is assumed as "x", the following formula is established:

$$256/\{x^*(\mathbf{8\text{-}1})+1\} \geq 1, \therefore x \leq 36.$$

The above formula shows that the reference thresholds can be expressed with 6 bits if the input data of 256 tones is converted into data of 8 tones by the multi-level dither processing. The basic hardware configuration of the encoder 53 is easily realized by using RAM and the like.

The result of the comparison between the 8-bit input data and the thresholds on the threshold plane, i.e., output tones are obtained in advance and supplied to an LUT (Look-up Table) 54 through selectors 55 and 56 when, for example, power is turned on. The selector 56 supplies the output data of the encoder 53 to the LUT 54.

The LUT 54 inputs the encoded data of maximum 6 bits (reference thresholds) and the input image data of 8 bits and 256 tones as address data, and outputs tones corresponding to the input image data as data of 3 bits and 8 tones. The LUT 54 consists of RAM and the like.

In the halftone processing section 24 constituted as stated above, the number of tones of dots to be printed is 8 but the section 24 can express halftones of up to 256. If the encoder 53 and LUT 54 are constituted of RAM and the like, a reference threshold array as shown in, for example, FIG. 6 is always determined first and stored in the encoder 53 through the selector 57. Next, the thresholds on seven planes are calculated based on this reference threshold array and the threshold array extending over the planes. Further, the dither processing result obtained by comparing the input image data of colors each having 8 bits and the thresholds on the planes at positions corresponding to the input data, is calculated. The calculation result is shown as a table and initially loaded to the LUT 54 through the selectors 55 and 56. Consequently, it is possible to conduct a multi-level dither processing employing an arbitrary threshold array.

Next, a sequence algorithm for a multi-level dither processing, that is, a threshold array determination method will be described with reference to FIGS. 6 and 7. To simplify description, FIGS. 6 and 7 show a dithering threshold array of very small size.

FIG. 6 shows a reference threshold array, and thresholds increase in this order on planes. This threshold array is a screw-type dither matrix having a screen angle of 45 degrees. In case of outputting data of eight tones as in this embodiment, seven planes are required. If eight types of thresholds are used on each plane as shown in FIG. 6, the number of halftones is 8 (tone)×7 (planes)+1 (white)=57, which number is smaller than that of an actual case. However, for brevity, the configuration of 57 tones will be described. It is noted that the basic processing configuration remains unchanged even if the number of tones increases.

In case of the reference threshold array shown in FIG. 6, the number of bits of the main counter 51 and the sub-counter 52 shown in FIG. 5 is 2 bits, respectively. Based on the 3-bit data obtained by encoding the output values of these counters in the encoder 53 and the input image data, the LUT 54 outputs the multi-level dither processing result as 3-bit image data.

FIGS. 7A to 7C show sequences of threshold arrays in depth direction, i.e., pixel level direction if the array shown in FIG. 6 is used as a reference threshold array. The thresholds are not normalized to 0 to 255 and indicated as a simple sequence of thresholds. In FIG. 6, if "56" is normalized, it corresponds to "255". In FIGS. 7A to 7C, the uppermost column indicate reference thresholds and the leftmost rows indicate threshold plane numbers.

Figure 8A:
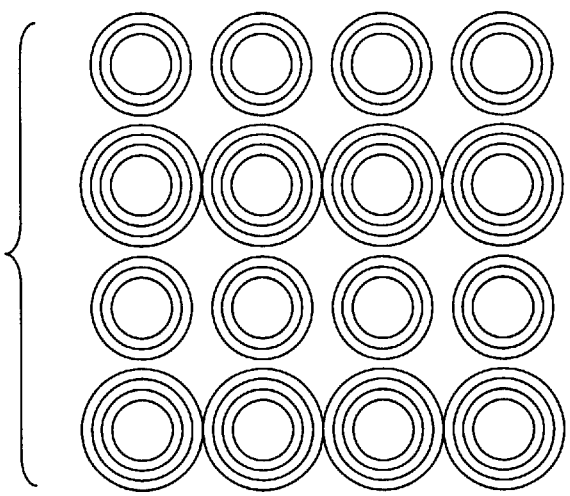
FIGS. 8A to 8C shows output examples of a multi-level dither processing using the sequences of FIGS. 7A to 7C, respectively.
Figure 8B:
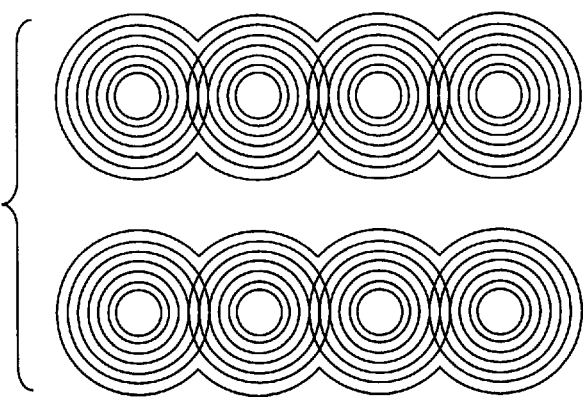
Figure 8C:
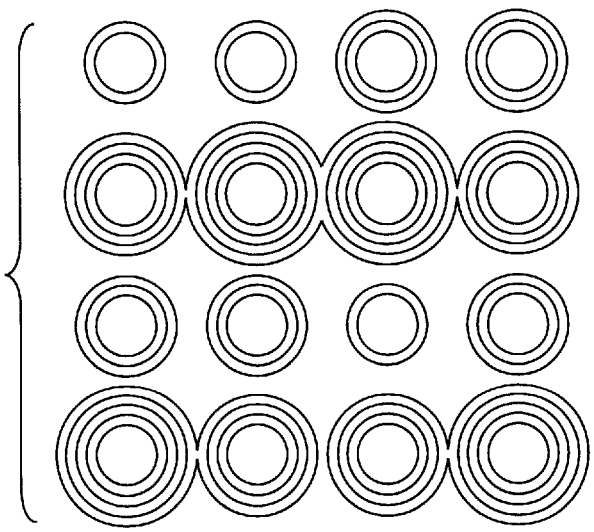
Figure 38A:
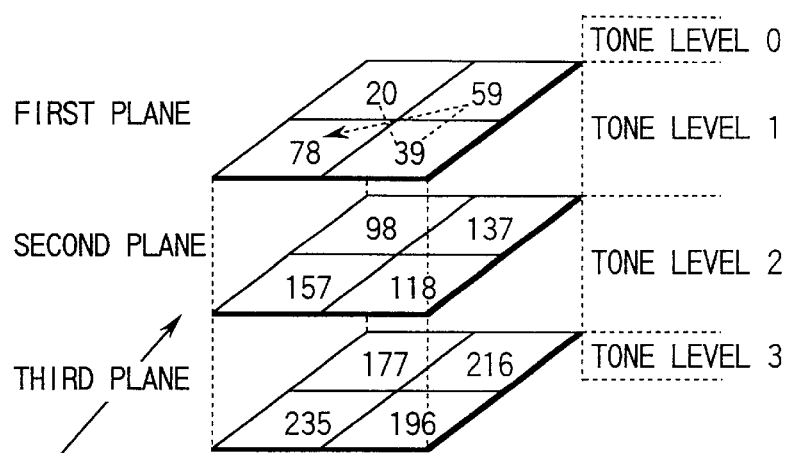
FIGS. 38A to 38C show a sequence of the multi-level dither processing.
Figure 38C:
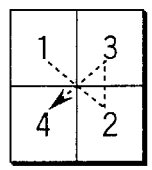
Figure 38B:
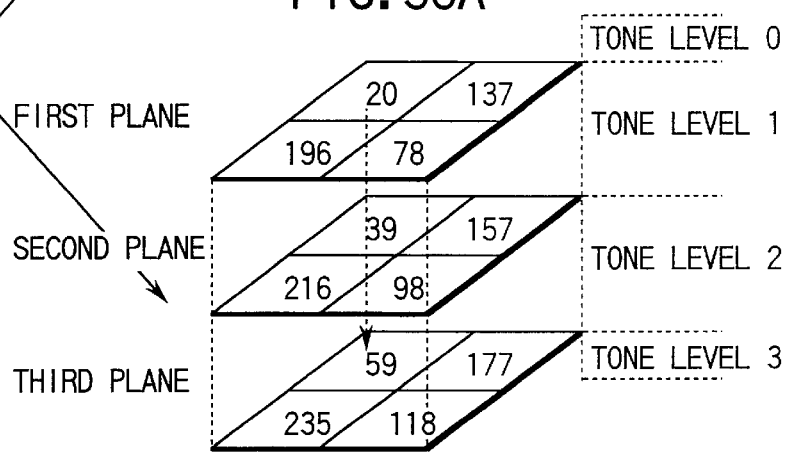

First, the threshold arrays among planes shown in FIG. 7A are the same in sequence as those shown in FIG. 38A. The arrays are susceptible to the printing error of the printer engine and the problems of unevenness of densities and vertical stripes tend to occur. The threshold arrays among planes shown in FIG. 7B are the same in sequence as those shown in FIG. 38B. The problem of unevenness of densities and vertical stripes occur to the arrays less frequently but resolution disadvantageously decreases. Further, the threshold arrays among planes shown in FIG. 7C exhibit intermediate output characteristics between those in FIGS. 7A and 7B. FIGS. 8A, 8B and 8C show examples of printed input data of uniform halftones (corresponding to, for example, the threshold 28 of FIGS. 7A, 7B and 7C) when the data is subjected to a multi-level dither processing and printed using the threshold planes of FIGS. 7A to 7C, respectively. In FIGS. 8A, 8B and 8C, concentric circles indicate the number of ink drops corresponding to output tones levels (plane numbers). FIG. 8A shows the result of processing and printing the input data using the threshold planes of FIG. 7A. FIG. 8B shows the printing result using the threshold planes of FIG. 7B. FIG. 8C shows printing result using the threshold planes of FIG. 7C.

Now, description will be given to a method of realizing optimum image reproduction for a printer by combining a sequences of a plurality of threshold planes. For brevity, the threshold sequence shown in FIG. 7A will be described.

Figure 9B:
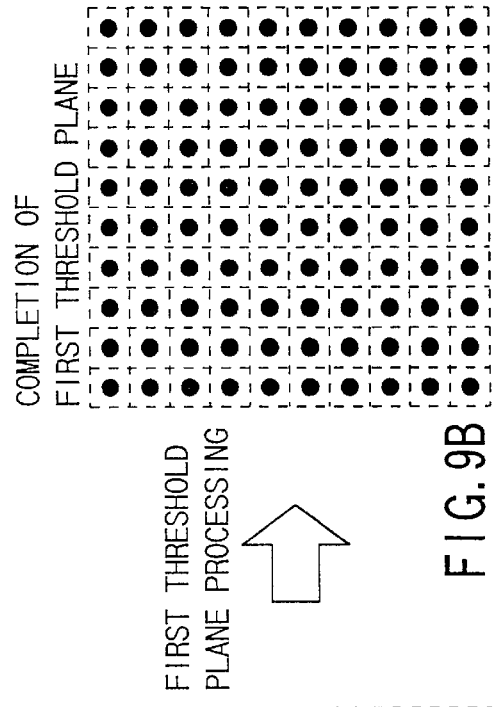
FIGS. 9A to 9D shows an example of pixel growth in the sequence of FIG. 7A.
Figure 9C:
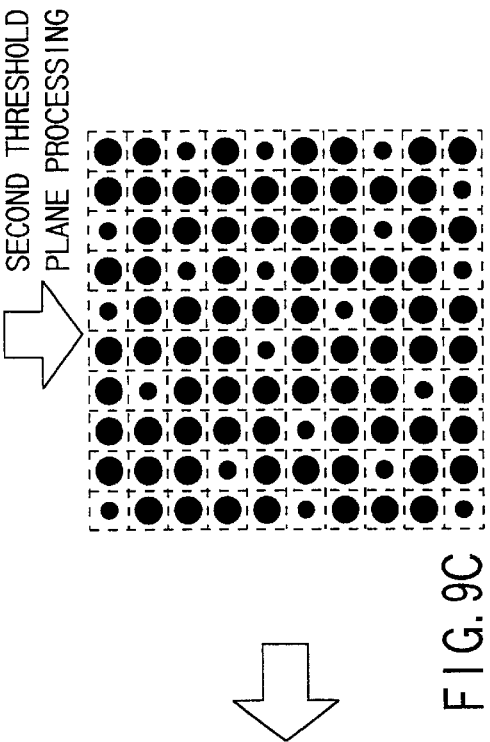
Figure 9A:
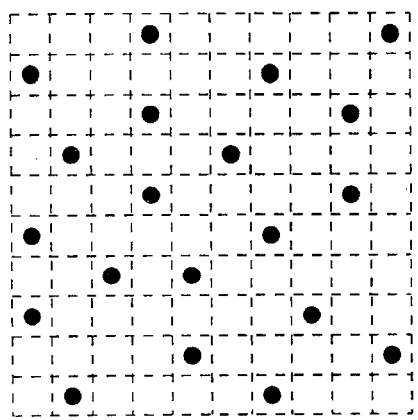
Figure 9D:

In the output of the multi-level dither processing, it is only a low tone level part to which the first threshold plane is targeted, i.e., a highlight that includes a tone "0" in pixels to be printed among input image regions. FIGS. 9A to 9D show the growing process of output pixels when input uniform images whose tone level increases gradually are subjected to a dither processing using the threshold planes. When the processing is completed using the first threshold plane as shown in FIG. 9B, the tone level 1 is output for all pixels. When the processing is completed using the second threshold plane as shown in FIG. 9D, a tone level 2 is output for all pixels.

If the input image of a uniform tone level, e.g., a tone level 9 is processed, an output pattern shown in FIG. 9B is obtained. That is, in the tone part having a tone level of "9" or higher, dots of some sizes are output at all positions. The tone part has AM modulation (only amplitude is changed) output characteristics with spatial frequency of a relatively high constant value. In that case, the respective pixels change to be gradually grown to halftone-dot reference unit.

This dot reproduction system can obtain far higher quality images in terms of graininess than a dot reproduction system, such as a binary output printer in which periods of ON pixels are not constant.

Moreover, in the low tone parts (regions of thresholds of 8 or lower in FIG. 7A) in which tones are reproduced in an FM modulation manner, that is, periods of ON pixels are not constant, the size of dots corresponding to the resolution pitch of the printer and formed on paper is very small. Thus, it is possible to obtain an image of good graininess. It is noted that "a low, middle or high tone part" indicates a region having a low, middle or high tone level in an input image and/or output image throughout the specification.

Further, in case of a multi-level dither processing, the number of thresholds used per threshold plane is a value obtained by simply dividing the number of input tones by the number of planes if the sequence is that shown in FIG. 7A. In the multi-level dither processing conducted to output eight tones, for example, the number of thresholds used per threshold plane is 256/(8-1)≈36. If an optimum threshold plane is designed using the 36 thresholds, the remaining threshold planes can be determined in the same manner. Accordingly, compared with a binary dither processing which employs 256 thresholds, which does not have periodicity and which requires designing one threshold plane, or reference thresholds, so as not to generate texture, the multi-level dither processing allows designing threshold planes easily.

As in the case of this example, in the output apparatus capable of forming multi-level images, the size of a small dot, i.e., a dot of a tone level 1 to that of a dot of several tone levels are smaller than the resolution pitch of the printer, so that neighboring dots do not contact with one another as shown in FIG. 4. With dots of such tone levels, a visually preferable image is printed if a pattern is designed so that dots are dispersed as much as possible. This is because blank portions (gaps between dots) are dispersed. At this moment, it is more preferable to design a pattern so that the dither threshold array is not seen as a repeated pattern.

In an actual printer, however, mechanical and physical accuracies are hardly manufactured in exactly the same manner on a two-dimensional plane in both main scan and sub-scan directions. Normally, due to the architecture of the printer, one accuracy is inferior to the other. In case of an ink jet printer, accuracy in main scan direction is lower due to the unevenness of the volume and discharge direction of ink discharged from ink discharge ports serving as recording elements.

If so, neighboring pixels overlap with one other in the sub-scan direction of a printed image and deep stripes occur or neighboring pixels are away from one another to thereby generate white stripes. In the low tone part in which neighboring dots are originally distant, these stripes are relatively inconspicuous. With the dot size in middle to high tone parts in which neighboring dots almost contact with one another, such stripes are most conspicuous.

Further, in case of the multi-level printer of this type, it is possible to obtain more visually favorable, smooth output with a dot pattern in which small dots are periodically, orderly dispersed in a low tone part by means of the ordered dither method than a dot pattern in which small dots are aperiodically, randomly dispersed, in most cases, though depending on the basic tone characteristics. Human visual characteristics has strong sensitivity in horizontal and vertical directions, so that it is possible to obtain higher image quality if neighboring dots are arranged in slant direction.

Figure 12:
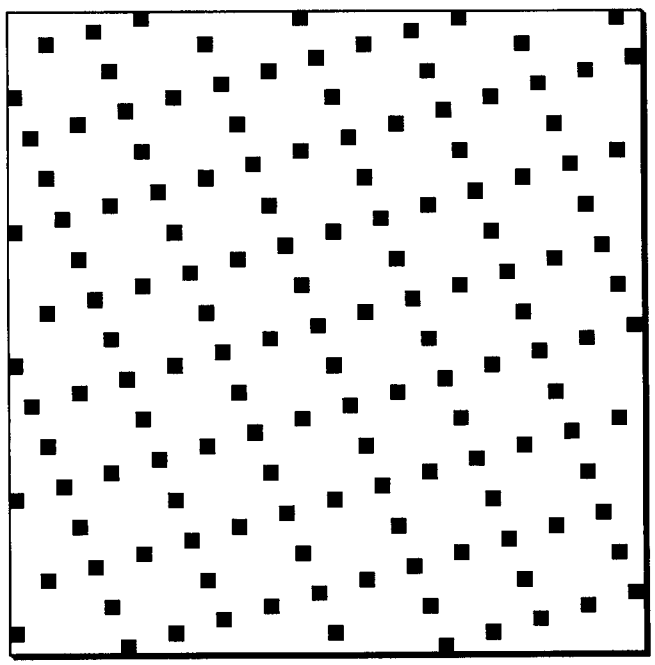
FIG. 12 shows an example of the appearance of a peculiar pattern in the dispersion ordered dither output pattern.

This state is shown in FIGS. 10A and 10B. FIG. 10B shows a pattern in which dots are arranged orderly and uniformly. The pattern shown therein appears visually smooth compared with a pattern in which dots are dispersed at random as shown in FIG. 10A. However, in the output pattern by the dispersion type ordered dither method, angles $\alpha$ and $\theta$ are changed when the respective neighboring tones are switched as shown in FIGS. 11A and 11B or a tone with which a peculiar pattern appears as shown in FIG. 12 exists. Accordingly, it is important to use the ordered dither pattern only for a low tone region in which dots are sufficiently smaller than the pixel pitch and such a tone is visually inconspicuous.

Figure 13:
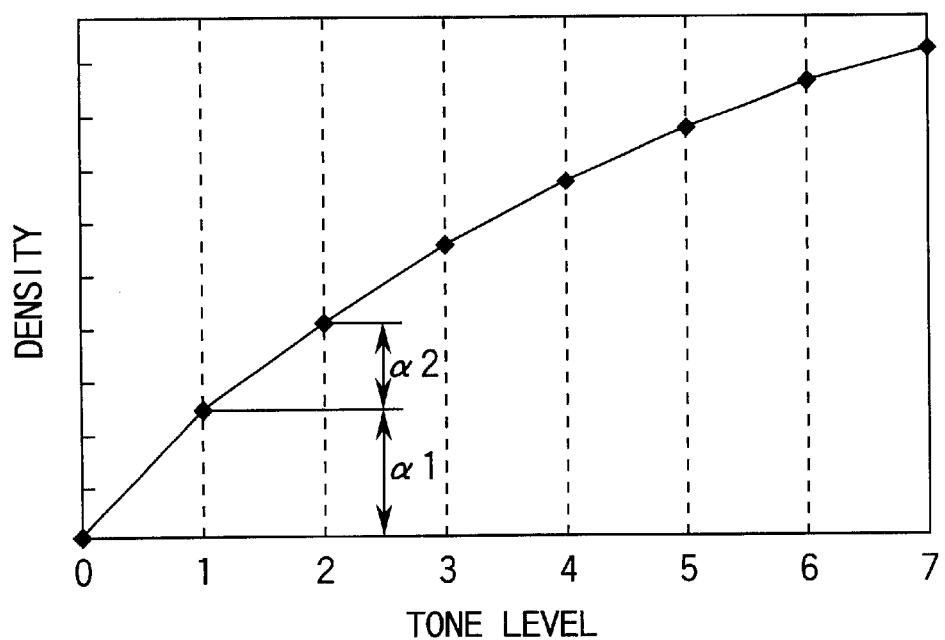
FIG. 13 is a graph showing the basic tone characteristics of a multi-dither processing.

Further, if the size of the dot of the maximum tone level 7 is set to at least completely cover a square pixel corresponding to the resolution, dots of respective tone levels have the characteristics shown in FIG. 13. FIG. 13 shows the result of measuring densities while the dots of the same sizes corresponding to the respective tone levels are printed on the entire paper sheet. The density characteristics with respect to the tone levels is referred to as "basic tone characteristics". As can be seen from FIG. 13, the density difference d1 from the density at a tone level 0 to that at tone level 1 is larger than that between other neighboring tone levels such as d2. Therefore, the low tone parts quite important to reproduce tones tend to have normally a large density change and low tone resolution.

Next, the dither threshold array according to the present invention will be described with reference to FIGS. 14A and 14B. The dither threshold array is used to subject input image data of 8 bits and 256 tones (0: white, 255: black) to a halftone processing to thereby convert the input data into data of 3 bits and 8 tones (0: white, 7: black). Symbol A2 in FIG. 14A denotes a unit matrix which size is 30×30. This size is reference threshold matrix size. Symbol A1 denotes a sub-matrix and the array of 1 to 4 low thresholds in the sub-matrix A1 is a part of a reference threshold array. The reference threshold array in the sub-matrix A1 is repeatedly used in the unit matrix A2.

Here, if input image data of 8 bits and 256 tones is converted into data of 3 bits and 8 tones by the halftone processing, the number of planes used is (8-1)=7. If the maximum number of thresholds used per plane is assumed as "x", the following formula is established:

$$256/(x*(8\text{-}1)+1) \geq 1 x \geq 36.$$

Namely, for seven threshold planes, the number of thresholds per plane is 36. In other words, there exist 36 output patterns (dot array patterns) corresponding to 36 tones on one plane. For reference, on the entire threshold planes at this moment, there exist output patterns corresponding to 36*7+1 (white)=253 tones.

If the 36 tones are formed in a matrix, 6×6 matrix is provided. As shown in FIG. 14A, the unit matrix A2 of 30×30 is large enough to contain five sub-matrixes of 6×6 in main scan direction and five in sub-scan direction. If the size of the unit matrix is set to be an integer multiple of that of the sub-matrix, the unit matrixes can be smoothly, conveniently coupled.

Next, the manner in which the reference thresholds are arranged will be described while using numeric values shown in FIG. 14A. It is noted that blank portions in the threshold matrix indicate parts occupied by numeric values of 5 or higher. Further, in a multi-level dither processing employing a plurality of threshold planes, pixels at positions corresponding to the thresholds are sequentially turned on from low to high thresholds. "Turned on" means that data of a tone level other than "0" is output from the LUT 54 of the halftone processing section 24 shown in FIG. 5.

Figure 14A:
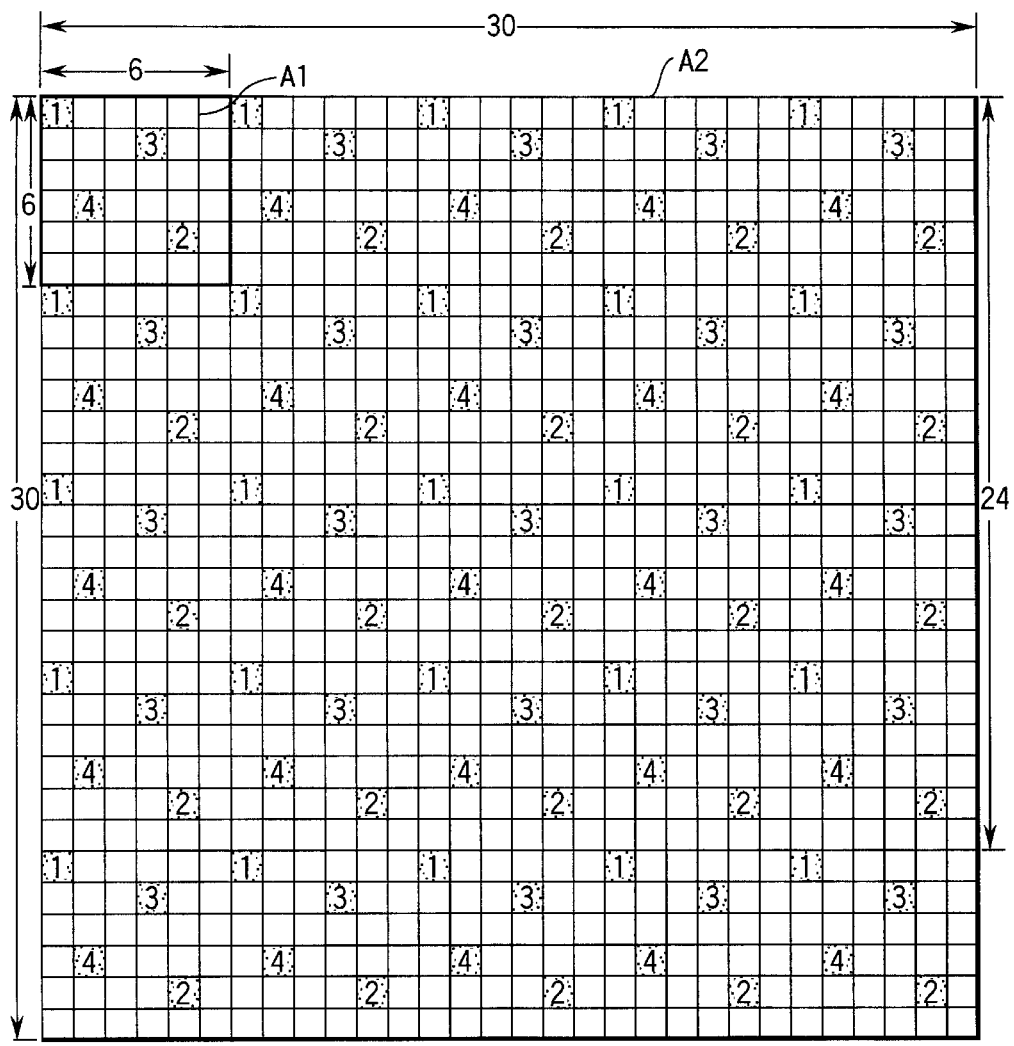
FIGS. 14A and 14B show a reference threshold array for low thresholds according to the present invention.
Figure 14B:
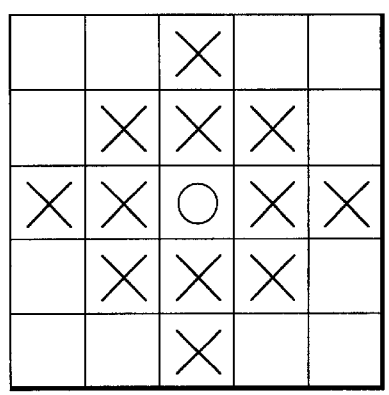

As shown in FIG. 14A, a plurality of sub-matrixes have the same low threshold array. That is to say, low thresholds are periodically arranged in the unit matrix. The low thresholds are 1 to 4 in this embodiment. Further, the low threshold array is designed so that threshold parts are not arranged closely in horizontal or vertical direction. This makes it possible to realize the reproduction of tones periodically, visually inconspicuously and smoothly in the low tone parts. Further, the distance between the neighboring low threshold parts is larger than two pixels as shown in FIG. 14B. In FIG. 14B, a circle at the center is a low threshold of interest and thresholds of 1 to 4 are not arranged at positions marked "x". Also, in the low threshold array, low thresholds are not alternately arranged in either horizontal or perpendicular direction. That is, the neighboring low thresholds are away from one another by not less than three pixels. By doing so, it is possible to prevent the deterioration of the graininess of the low tone parts.

Next, thresholds are occupied in blank portions in the matrix. Threshold values (in this example, thresholds of 5 to 36) are arranged aperiodically over a plurality of continuous sub-matrixes in relatively middle to high tone parts. As a result, aperiodic dot patterns are output in the middle tone parts to the high tone parts.

The easiest method to realize this arrangement is to determine the array of thresholds 5 to 36 at random. That is, the positions of thresholds are determined at random for each sub-matrix and thresholds are allotted to the determined positions in the order from low to high values. By doing so, it is possible to allot thresholds 1 to 36 over the entire unit matrix size.

Normally, the threshold pattern determined at random tends to constitute visually uncomfortable continuous planes (dot blocks) and to produce a noisy output image. In this embodiment, however, since the low thresholds are most uniformly dispersed and orderly arranged, and neighboring dots are out of contact except for those close to the highest level in a multi-level output printer, visually uncomfortable blocks are difficult to recognize compared with a case of binary output. Accordingly, even if middle to high thresholds are generated at random, visually uncomfortable output patterns are not generated.

Figure 15:
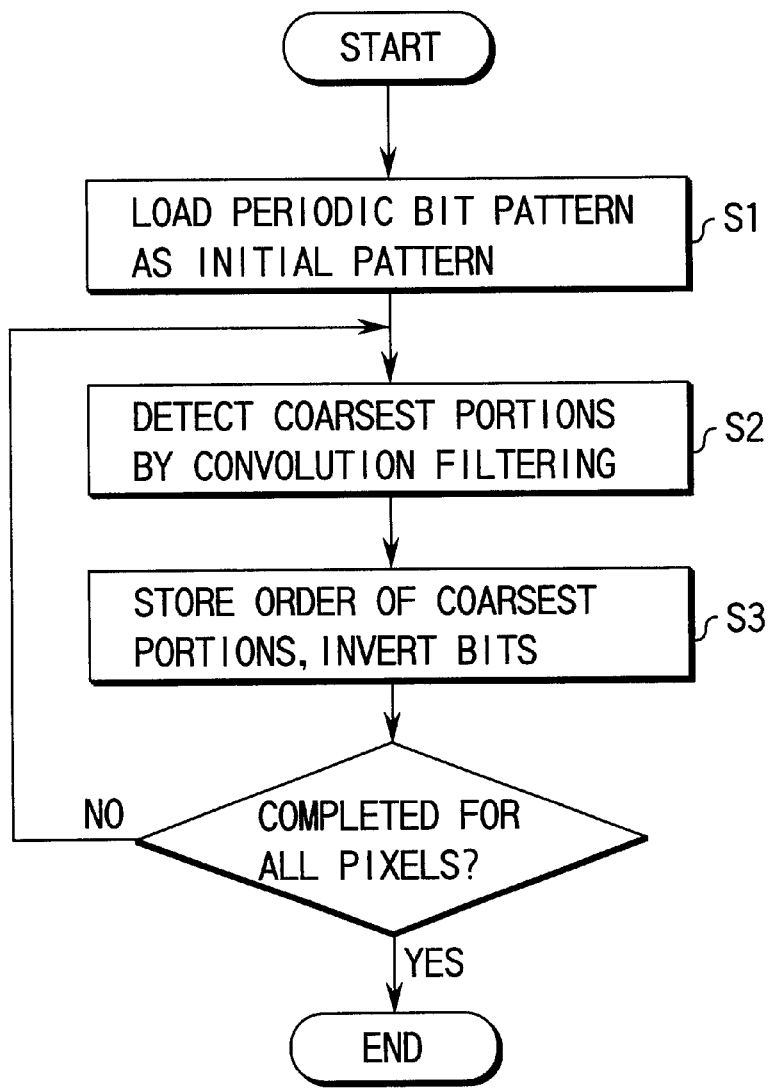
FIG. 15 is a flow chart showing a threshold generation processing according to the present invention.

A more preferred method of obtaining the threshold array is to determine a portion having the highest dispersibility in each unit matrix by convolution filtering while also referring to peripheral sub-matrixes. The processing is shown in the flow chart of FIG. 15.

First, in a step S1, it is assumed that portions denoted by thresholds 1 to 4 in FIG. 14A are determined, a bit pattern of 30×30 in size having the determined portions set at 1 and the remaining portions set at 0 is loaded as an initial pattern to the RAM. Next, in a step S2, the initial pattern is subjected to convolution filtering and the most coarse portion among portions having a initial pattern value of 0, i.e., the portions having the lowest value as a result of filtering operation are detected. It is discovered that an excellent output pattern can be obtained if a filter indicated by the following formula (1) is used as a preferred convolution filter at that moment.

$$\text{Filter}(i, j) \propto \exp\left[-\left\{\frac{i^2}{k_i^2} + \frac{j^2}{k_j^2}\right\}^n\right] \tag{1}$$

In formula (1), i is a convolution variable in main scan direction, j is a convolution variable in sub-scan direction and ki, kj and n are constants.

The optimum values of ki and kj are determined according to the diameter of a lowest tone level dot and the distance of dots actually printed. The optimum value of the exponential part n is determined according to the shape of dots, or particularly, the shape of a dot edge. The above formula is one example of an approximation calculation formula for patterning the optical characteristics, such as ink density, of ink dots printed on a paper sheet.

At calculation, a case where there are a plurality of portions having the same minimum value is assumed. This case tends to occur frequently since the initial pattern is a periodic ordered dither pattern. In this case, it is possible to randomly determine which portions to select or to select the first calculated portions.

Next, in a step S3, the order of the detected portions is stored. In this example, the target is not a sub-matrix unit but an entire matrix size and the order in the entire matrix size is determined. Further, a pattern in which bits at the determined positions are changed from 0 to 1 is generated. This processing is repeatedly carried out until a bit pattern of 0 is eliminated and the priority or order of all of the 30×30 pixels is determined. As for the priority, if the first priority is given to the low threshold parts (25×4=100) which have been already determined by the periodic pattern, priority are obtained from 101 to 900 in the above calculation. According to this priority, the thresholds 5 to 36 are allotted.

In case of a matrix of 30×30 in size, thresholds increase one by one at intervals of 25 matrix elements. That is, 25 elements have the same threshold. In this way, the positions of elements having remaining thresholds 5 to 36 are determined and the thresholds of all elements in the unit matrix of 30×30 in size are eventually determined.

According to this processing, thresholds are determined so that output dots are made continuous in the direction of relatively low printing accuracy out of the main scan direction and the sub-scan direction. Specifically, the weight of the filtering operation is changed relatively between the main scan direction and the sub-scan direction. In other words, a weight is added to both values ki and kj in the formula (1). For example, the relationship between ki and kj is set at ki<kj, thereby making it possible to generate a pattern which can be easily coupled in the main scan direction having low printing accuracy.

Figure 16A:
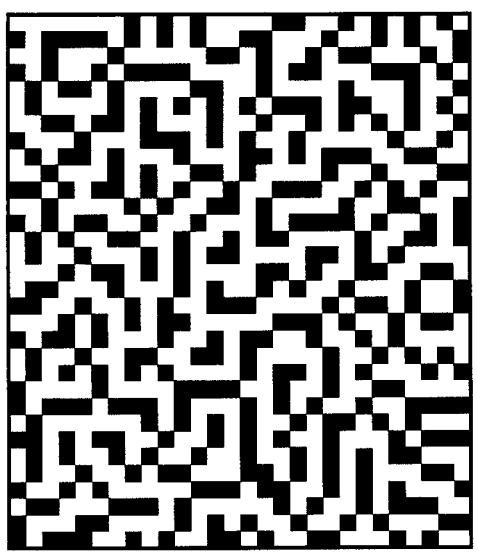
FIGS. 16A to 16C show dot reproduction in basic dither thresholds according to the present invention, respectively.
Figure 16B:
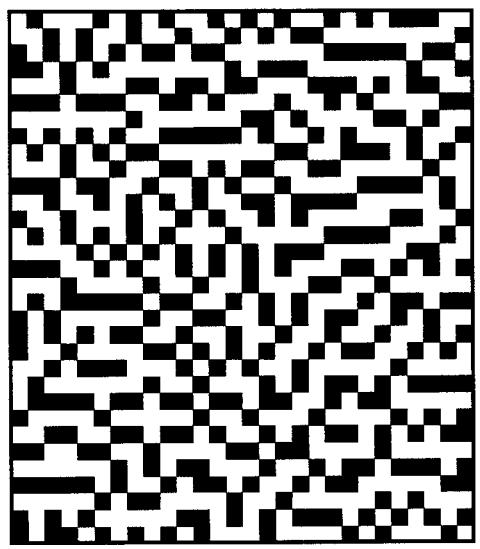
Figure 16C:
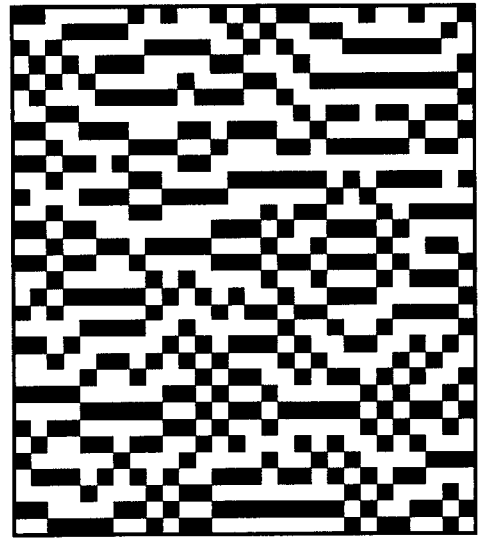

The coupling strength is preferably set optimum according to printing accuracy by changing the rate of ki and kj as shown in FIGS. 16A to 16C. FIG. 16A shows a case where ki=kj and thresholds are arranged isotropically. That is, the thresholds having similar size are arranged without directivity. FIG. 16B shows a case where ki<kj and thresholds are arranged anisotropically in main scan direction. That is, thresholds having similar sizes are arranged in main scan direction. FIG. 16C shows that ki is far larger than Kj and that thresholds are arranged further anisotropically in main scan direction.

The reference threshold array thus generated anisotropically, does not have a large correction effect with respect to printing error on a single plane; however, by combining the array with sequences of a plurality of threshold planes, it is possible to greatly reduce unevenness of density and strips derived from printing error. It is noted that if a binary dither processing is conducted using this anisotropic threshold array in the binary printer, large dots relative to the resolution pitch are coupled one another at neighboring pixels, thereby making it difficult that unevenness of density and stripes take place. Accordingly, the binary dither processing exhibits an effect by employing only this reference threshold array (one plane).

It is discovered that the number of low threshold elements by the above-stated periodically ordered dither is preferably about 1/10 of the entire number of elements in sub-matrixes. If this rate is too high, the degree of freedom for the arrangement of thresholds in vacant regions is considerably decreased, with the result that unnatural texture may possibly occur at specific tones. Experiments demonstrate that if the number of the elements of these low thresholds is 0 to 20% of the entire number of elements, good result is obtained.

Figure 17:
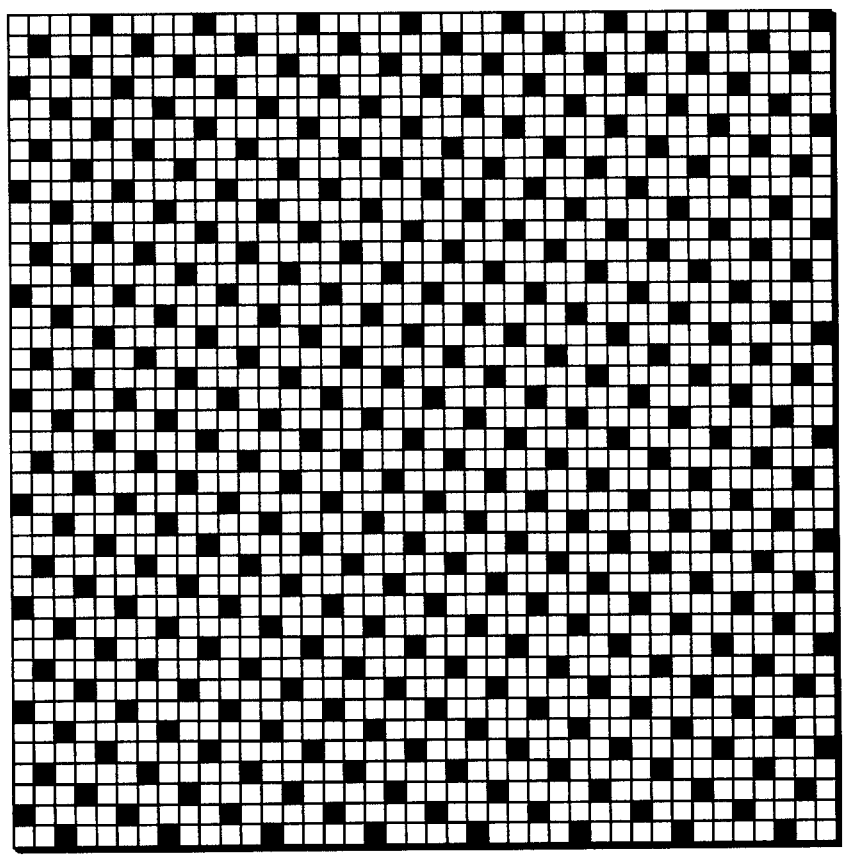
FIG. 17 shows a pattern in which a low threshold range constituted by ordered dither is set at 20% of a reference threshold range.

FIG. 17 shows a case where the number of the elements of the low thresholds is a maximum 20% of the entire number (ON 320/all pixels 1600=20%). To freely arrange the remaining dots, 20% is the limit. If not less than 20% of the entire elements are designated for a periodic pattern, texture inevitably, greatly occurs.

Next, the size of a unit matrix will be considered. If a unit matrix is too small in size, a periodic or unnecessary texture pattern disadvantageously appears. Considering this, it is necessary that the unit matrix has a size which is appropriate but not redundant. The optimum size varies according to the basic tone characteristics of the respective dots shown in FIG. 13 and to congeniality with a paper sheet to be used. Unless the tone level and optical characteristic have an extremely nonlinear relationship, K and L are set to be integers within the range of the following formula (2) while a unit matrix size is assumed as K×K and the number of output tones after forming multi-level data is N.

$$\frac{2^6}{\sqrt{N-1}} \leq \sqrt{K \times L} \leq \frac{3 \times 2^6}{\sqrt{N-1}} \tag{2}$$

In case of a square matrix (L×L), in particular, L is set to be an integer within the range of the following formula (3), whereby it is possible to suppress the occurrence of periodicity and texture.

$$\frac{2^6}{\sqrt{N-1}} \le L \le \frac{3 \times 2^6}{\sqrt{N-1}} \quad (3)$$

The smallest limit size of the unit matrix is determined from a visual tolerance limit and the largest limit size means the largest size which is not redundant. The matrix size thus derived is far smaller than a size of 128×128 which is normally employed in binary stochastic dither and a dither processing can be, therefore, realized in a smaller hardware configuration.

Moreover, as long as the conditions of sub-matrix size and unit matrix size are met, a non-square matrix of, for example, 30×24 shown in the right of FIG. 14A may be used.

Figure 18:
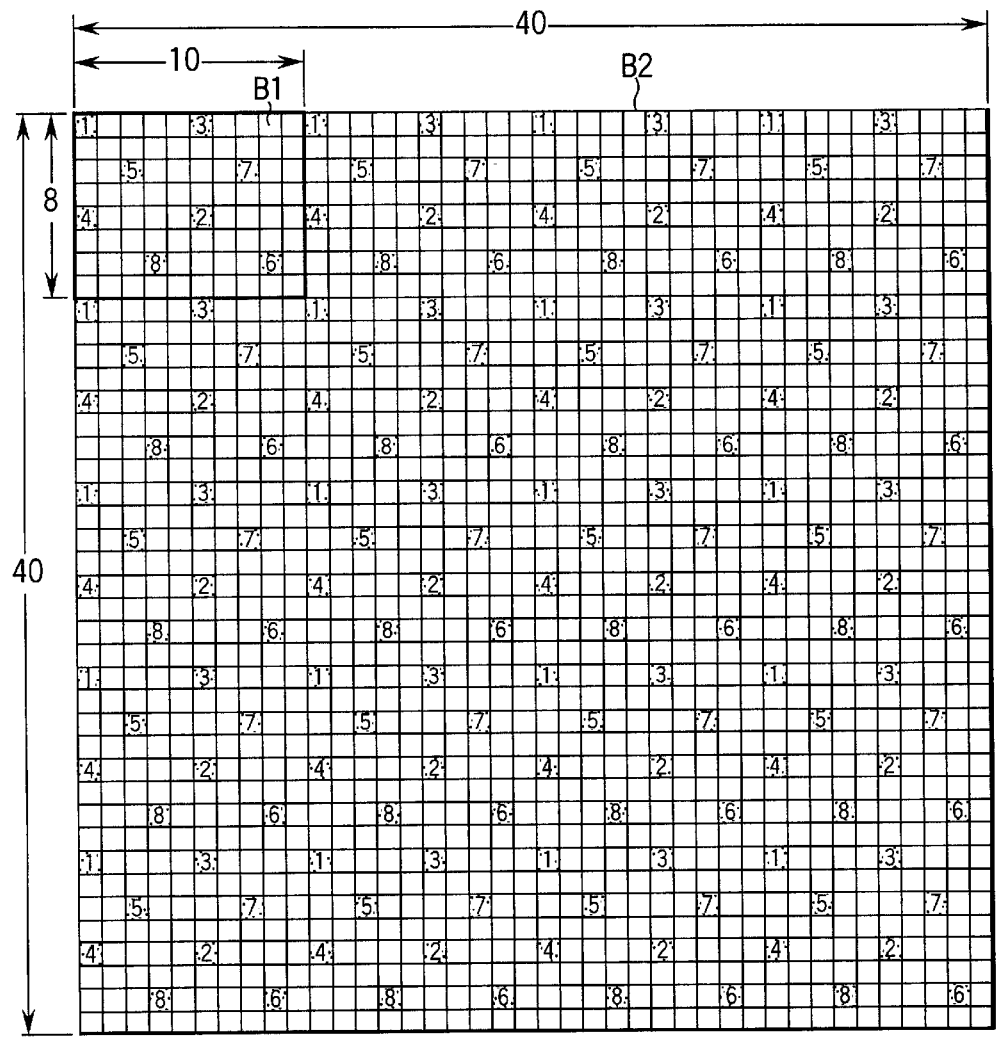
FIG. 18 shows another reference threshold array according to the present invention.

In the above example, description has been given while assuming that the sub-matrix is a square matrix. However, it may be a rectangular matrix shown in FIG. 18. Next, the size of a rectangular matrix will be described. FIG. 18 shows a unit matrix for subjecting input tone image data of 8 bits and 256 tones (0: white, 255: black) to a halftone processing to thereby convert the image data into image data of 2 bits and 4 tones (0: white, 3: black).

In this case, the number of planes used is (4-1) or 3. If the largest number of thresholds used on one plane is assumed as "x", the following formula is established.

$$256/\{x*(4-1)+1\} \ge 1, \therefore x \le 85.$$

In other words, the number of tones for which the three planes are responsible are 85, respectively. However, the number of tones is not necessarily limited to 85. To simplify description, each threshold plane assumes thresholds corresponding to 80 tones. For reference, the entire threshold planes at this moment can reproduce tones of 80*3+1 (white)=241.

If the smallest unit matrix constitute 80 tones, the size of the threshold matrix becomes 10×8. By conducting a dither processing employing this 10×8 threshold matrix, a pattern of 80 tones is reproduced. Here, if it is assumed that a threshold array B1 of 10×8 is a sub-matrix, a unit matrix B2 of 40×40 is large enough to contain four sub-matrixes B1 in main scan direction and five in sub-scan directions, or contain 20 sub-matrixes B1 in all.

If the size of the unit matrix is set to be an integer multiple of that of a sub-matrix, ordered dither processing are conveniently, smoothly repeated. In FIG. 18, a sub-matrix consists of 10 pixels in main scan direction and 8 pixels in sub-scan direction. It is also possible to change the number of pixels between main and sub-scan directions.

Further, as long as the size of the unit matrix satisfies the conditions of the following formula (4), the unit matrix may be a non-square matrix of, for example, 40×48.

$$\frac{2^6}{\sqrt{N-1}} \le \sqrt{K \times L} \le \frac{3 \times 2^6}{\sqrt{N-1}} \quad (4)$$

Figure 19:
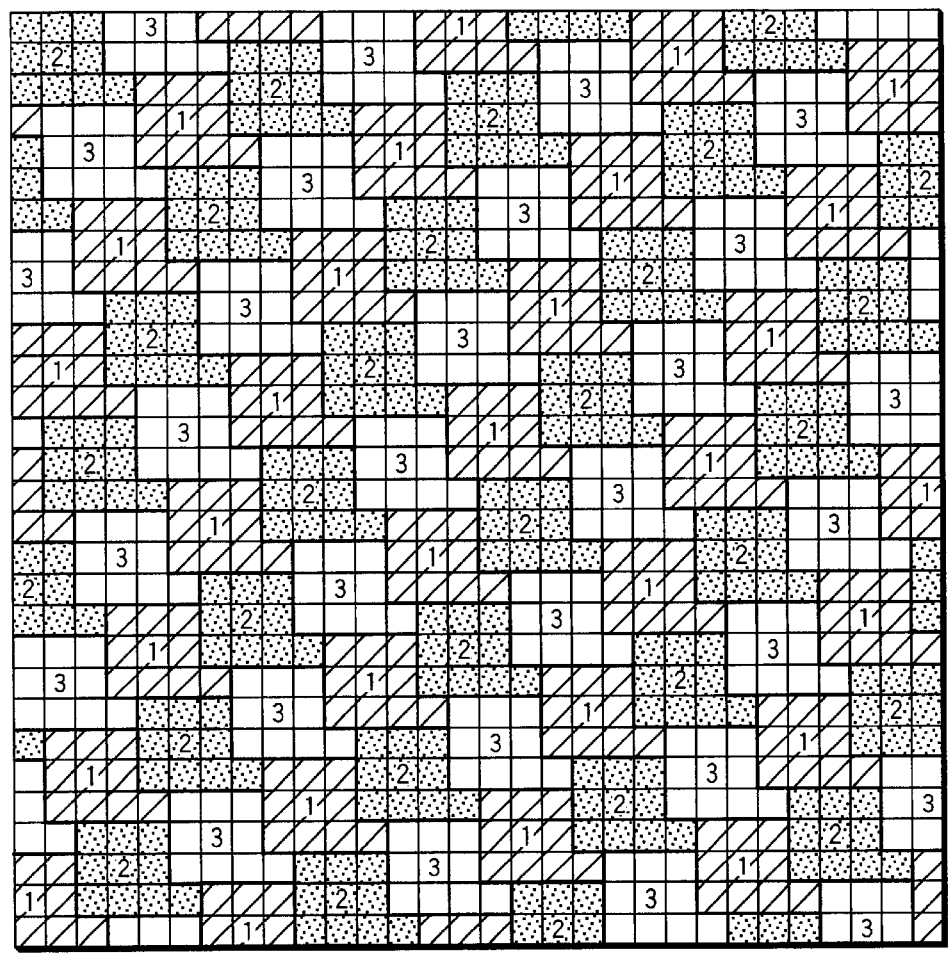
FIG. 19 shows yet another reference threshold array according to the present invention.

Each of the low thresholds arrays in sub-matrixes shown in FIGS. 14A and 18 is an example of forcedly including oblique components. With the above-stated method, however, thresholds in all matrixes can be generated only by using the pattern of the low tone part for a screen dither matrix having an appropriate number of tones, an appropriate angle and an appropriate matrix size as shown in, for example, FIG. 19. Needless to say, the conditions of the formulas (2) and (3) and those for the respective matrix sizes are satisfied in this case, as well.

Further, the number of entire tones to be reproduced is not necessarily limited to 256. Since an intrinsic number of reproduced tones is determined even if screen dither is employed, it suffices that an appropriate number of visually satisfactory tones are be reproduced. In this example, too, the low threshold array is calculated according to the principle of the periodically ordered dither.

Next, another preferred embodiment will be described. In this embodiment, the reference threshold array in a dither matrix is set so that the low tone part is aperiodic over continuous sub-matrixes and that dots in random sizes are output. From the middle tone to high tone parts, the reference dither threshold array is set so as to have an anisotropic output pattern in which dots are continuous in scan direction in which printing accuracy is relatively low.

This embodiment is applied to a printer which is capable of obtaining a visually, characteristically beautiful image if dots are reproduced to be dispersed aperiodically rather than dots are reproduced periodically, as shown in FIG. 14A, in the low tone part of a printed image. In this embodiment, as in the case of the above, the range of the low thresholds is about 0 to 20% of the maximum threshold arranged in the unit matrix. That is, this embodiment is applied to a printer in which unevenness of density and stripes tend to be always conspicuous from the middle tone to high tone parts irrespectively of printing accuracy but unevenness of density and stripes due to printing error tend to be relatively inconspicuous in the low tone part.

The setting of thresholds may be changed even in the low tone part in which unevenness of density and strips due to printing error are actually relatively inconspicuous in accordance with an image printed by a printer as follows.

Namely, the low threshold array of the printer in which irregularity of printing and stripes are less conspicuous in the low tone part may be designed to have an output pattern completely isotropic as shown in FIG. 10A, in which the same number of dots are stochastically, statistically output in all rows and columns in the main scan direction and sub-scan direction of the matrix instead of the pattern shown in FIG. 14A and this output pattern may be used as an initial pattern.

Using this initial pattern, thresholds in higher tone parts are formed at random or such thresholds are provided as to provide an anisotropic output pattern in which dots are continuous in scan direction in which printing accuracy is relatively low, by using a convolution filter. Similarly, dot coupling strength from the middle tone to high tone parts is preferably set to be optimum according to printing accuracy.

In this embodiment, the order of thresholds in the threshold array in the low tone part is not initially determined unlike the ordered dither pattern. Accordingly, a low threshold array is obtained in advance so that the same number of dots are stochastically, statistically output in all rows and columns of the matrix at the respective low tone levels. Further, the threshold array in the low tone part may be calculated by applying means for calculating thresholds in the high tone part (such as a convolution filter processing). In addition, since the matrix size is relatively small and the number of tones in the low tone part is small enough, an optimum array may be determined manually.

Moreover, in case of a printer in which unevenness of density and stripes are relatively conspicuous even in a low tone part, a reference dither threshold array is set so as to have an anisotropic output pattern in which dots are continuous in scan direction, in which printing accuracy is relatively low, even in the low tone part. A threshold array in this case may be determined so as to have a completely anisotropic pattern, unlike the pattern shown in FIG. 14A, in which dots are forced to be output continuously in the main scan direction of the matrix and this pattern may be used as an initial pattern. Further, this low threshold array may use an output pattern processed by the error diffusion method in which the coefficients of an error diffusion matrix are optimized, as an initial pattern so that arbitrary uniform tone dots are continuous in main scan direction. Alternatively, an ordered dither threshold array having thresholds characteristically coupled in main scan direction in the low tone part may be used as an initial pattern. Using this initial pattern, thresholds in higher tone parts may be obtained by the same manner stated above.

As a result, it is possible to obtain a reference threshold array for providing optimum output in the entire tone regions to the printer in which it is visually preferable to output dots periodically to realize dots periodically as shown in FIG. 14A. Further, it is possible to obtain reference dither thresholds which form an anisotropic output pattern in the middle and high tone parts so as to make irregular printing and stripes inconspicuous.

As already described above, various types of reference threshold arrays thus generated do not have a large correction effect with respect to printing error if used solely in a multi-level printer. However, by combining the arrays with sequences among threshold planes, they can advantageously, greatly reduce unevenness of density and stripes derived from printing error.

While the reference threshold arrays have been described above, a method of developing a reference threshold array in the respective threshold plane directions will be described hereinafter.

As stated above, the basic tone characteristics, as shown in FIG. 13, of the printer for reproducing tones by area modulation varies greatly with multi-level dither processing sequences.

Speaking of compensation for irregularity of printing and stripes derived from printing error, the above two threshold array factors, i.e., the reference threshold array and sequences among the threshold planes, can contribute more to the improvement of image quality by changing sequences among a plurality of multi-level threshold planes.

Unlike a printer in which threshold sequences are restricted by the architecture of an apparatus, the printer according to the present invention can change sequences among the threshold planes relatively easily. Changing sequences among the threshold planes can advantageously suppress occurrence of irregularity of printing, stripes and the like derived from printing error but, at the same time, largely influence the resolution and tone reproduction characteristics. It is, therefore, required to make such changes deliberately.

This embodiment is designed to realize two optimizations in respect of threshold sequences. The first optimization will be described with reference to FIG. 13. As already stated above, FIG. 13 shows the ordinary basic tone characteristics of an output apparatus for reproducing pixels by area modulation and shows that the tone resolution of a low tone part is lower than those of the middle and high tone parts. If so, in the low tone part, tones can be reproduced more accurately by printing an image while appropriately mixing dots of tone level 1 with those of other tone levels according to the tone levels of input pixels rather than printing an image while using dots of the same size and tone level 1.

Figure 20A:
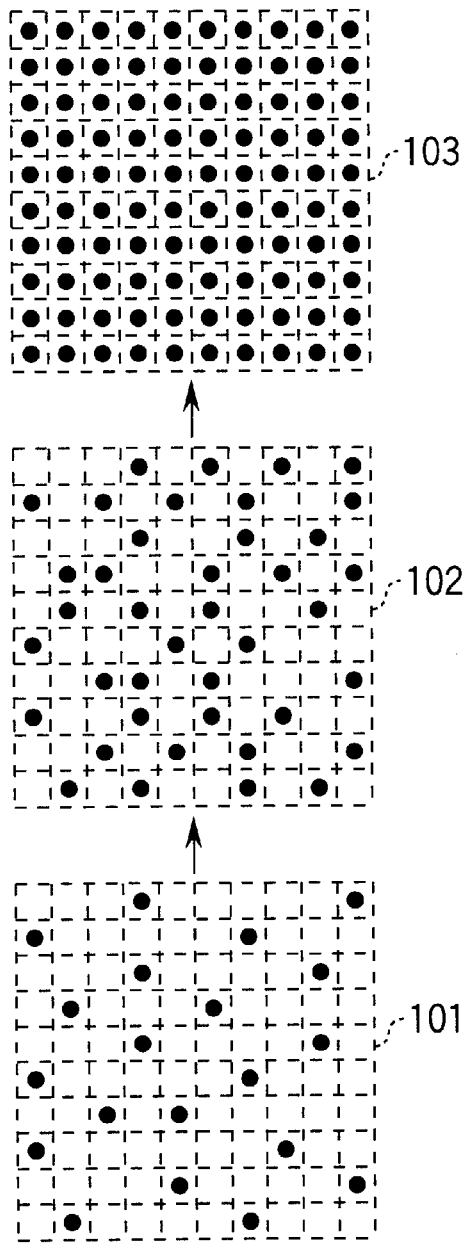
FIGS. 20A and 20B show examples of pixel growth using the threshold sequences of the present invention, respectively.
Figure 20B:
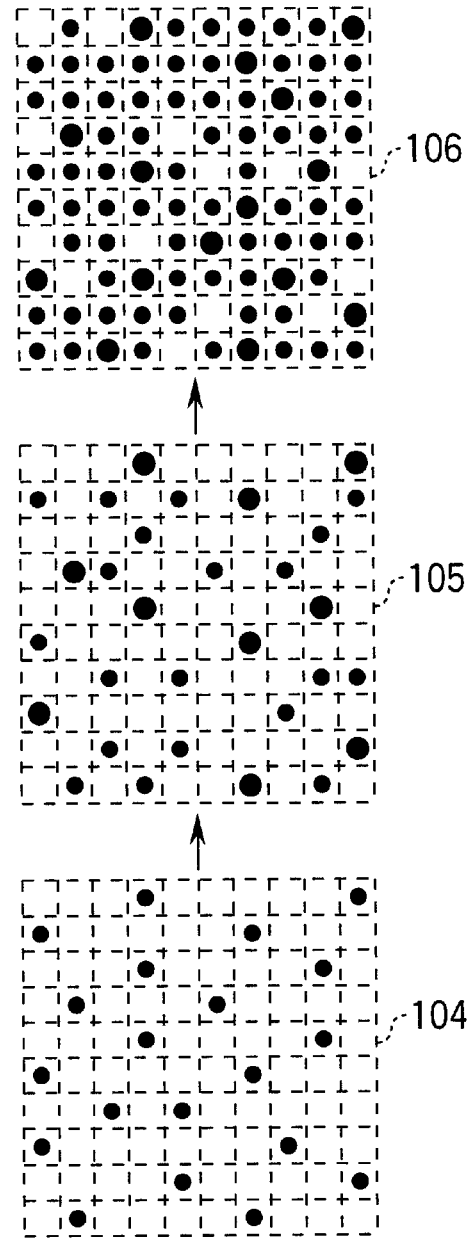

This state is shown in FIGS. 20A and 20B. FIG. 20A shows the growing process of dots if an image is processed by means of a threshold plane sequence which can realize the highest resolution as shown in FIG. 7A. In FIG. 20A, reference symbol 101 denotes the result of processing an input image of, for example, uniform tone level 2 in the threshold range of FIG. 7A using the threshold plane of FIG. 7A, reference symbol 102 shows the result of processing an input image of, for example, uniform tone level 4 in the threshold range of FIG. 7A using the threshold plane of FIG. 7A and reference symbol 103 denotes the result of processing an input image of, for example, uniform tone level 9 in the threshold range of FIG. 7A using the threshold plane of FIG. 7A.

On the other hand, as shown in FIG. 20B, it is theoretically possible to obtain output of the same density as that in FIG. 20A by outputting dots of difference sizes. Reference symbols 104 to 106 denote the results of processing an input image of the same tone levels as those of reference symbols 101 to 103 of FIG. 20A, respectively.

Judging from the output characteristics shown in FIG. 13, more smooth density change can be obtained between neighboring tones in the growing process of FIG. 20B. It is noted, however, that the processing using the threshold plane sequence is applied to a printer in which various sizes of uncomfortable patterns are visually inconspicuous since dots larger than those of tone level 1 are output to the low tone part.

Figure 21A:
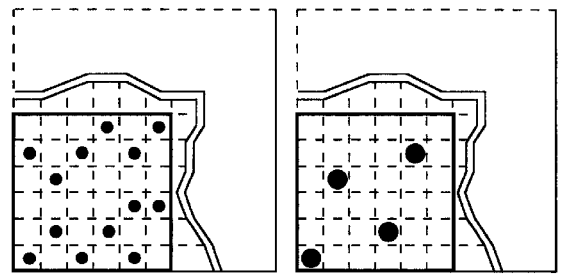
FIGS. 21A and 21B show other examples of pixel growth using the threshold sequences of the present invention, respectively.
Figure 21B:
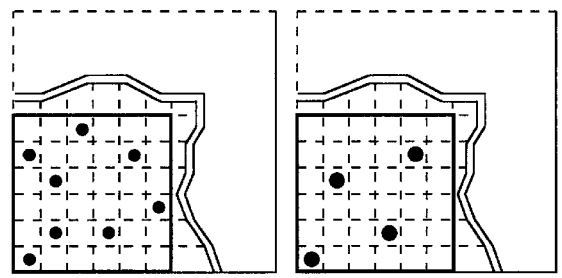

Next, a preferred method for obtaining an optimum dot output pattern will be specifically described. As shown in FIG. 21A, if an input image has low tones, dots larger than those of tone level 1 by several tones are first grown before dots of tone level 1 are output instead of using an output pattern for outputting only dots of tone level 1. If the size of the dots is such that the dots cannot be visually recognized as large dots, while tones of the low tone input image are smoothly changed, a resultant output pattern has far smoother tone level change than that of the output pattern shown in FIG. 21A.

Figure 22:
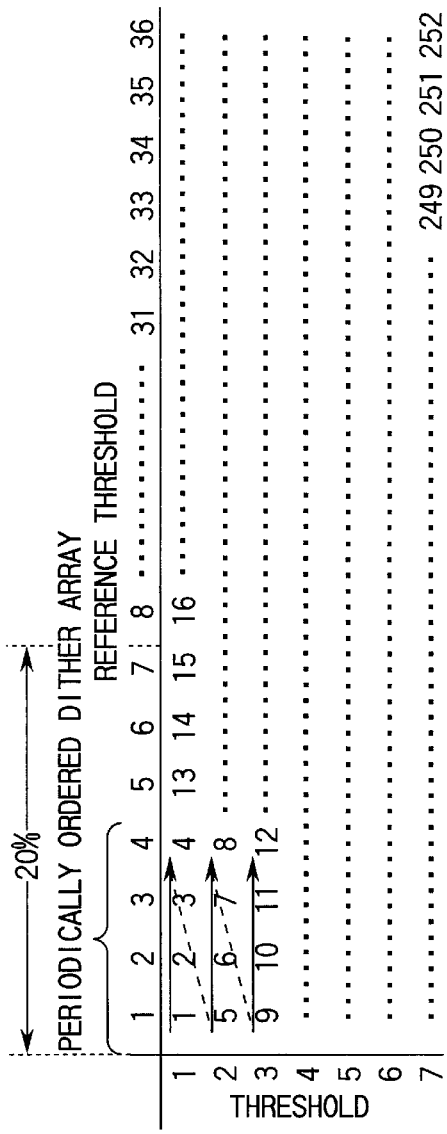
FIG. 22 shows one example of the threshold sequence of the present invention.

A threshold sequence for realizing this output pattern of FIG. 21A is shown in FIG. 22. In this example, low thresholds (corresponding to reference thresholds 1 to 4) on the threshold planes 1 to 3 form a periodically ordered dither array. Therefore, dots of up to tone level 3 are preferentially output to positions corresponding to these thresholds. This processing is effective in that it can advantageously make an output pattern per se visually preferred but also it can advantageously obtain an output pattern resisting printing error and the like because neighboring dots are away from one another. The thresholds exhibiting such advantages fall in a range corresponding to tone levels of about 0 to 10% of the highest tone level of an input image. The thresholds range is determined according to the basic tone characteristics of the printer.

The threshold range corresponding to the tone levels of 0 to 10% of the highest tone level is a range of values 0 to 25 if the highest input tone level is, for example, "255". The number of planes on which such series of low thresholds are arranged is also determined according to the basic tone characteristics of the printer. In case of constituting a plurality of threshold planes using the thresholds corresponding to the tone levels of 10% of the highest tone level, thresholds included in a periodic dither array are, as shown in FIG. 22, those corresponding to the reference threshold (reference threshold 7) which is 20% of the highest threshold (reference threshold 36 in FIG. 22). Moreover, the thresholds of the periodic dither array are arranged on half the planes (three planes having low average thresholds) of the entire threshold planes (seven planes in FIG. 22).

The above description concerns a case of preferentially outputting dots of up to tone level 3 to a periodic output pattern. Actually, however, the setting of this sequence largely relies on the tone characteristics shown in FIG. 13, i.e., dot diameters corresponding to tone levels. That is, dot size largely depend on the resolution of the printer. For example, in case of the resolution of 300 dpi and 600 dpi, the size and pitch of the smallest dot differ even if the output tone level is the same. Also, as the resolution of the printer is higher, the diameters of dots actually measured are greatly shifted from ideal dot diameters in design, with the result that basic tone characteristics tends to be nonlinear.

Figures 23A, 23B:
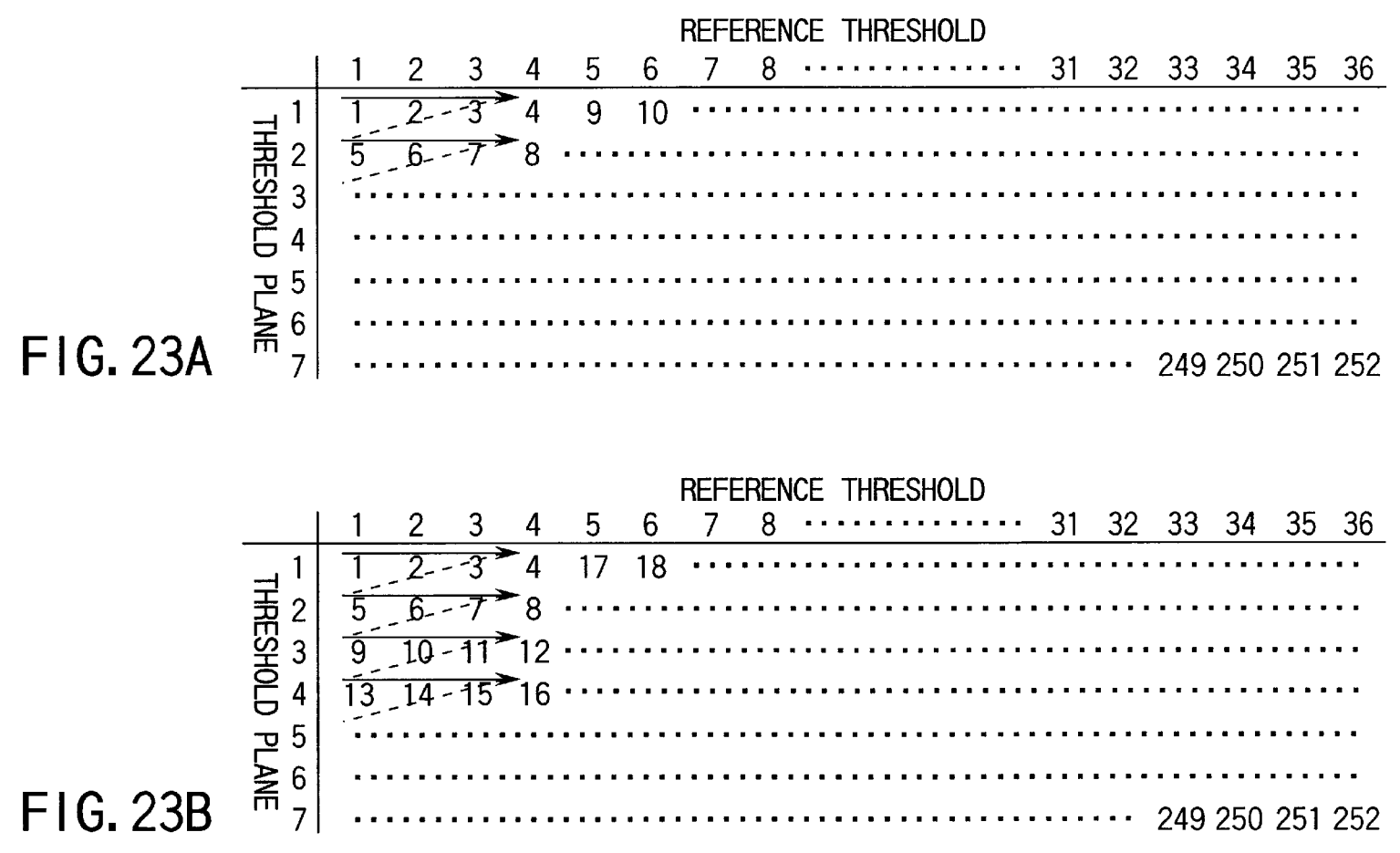

Based on the above, therefore, the design of the sequence is optimized as shown in FIGS. 23A and 23B according to the above principle and according to the tone characteristics (particularly dot diameters at the respective tone levels) which vary with printers due to the above-stated factors. Further, the setting of the sequence can be optimized as shown in FIGS. 23A and 23B by printing accuracy according to the above principle. In FIG. 23A, dots of up to tone level 2 are preferentially output. In FIG. 23B, dots of up to tone level 4 are preferentially output.

Figure 24:
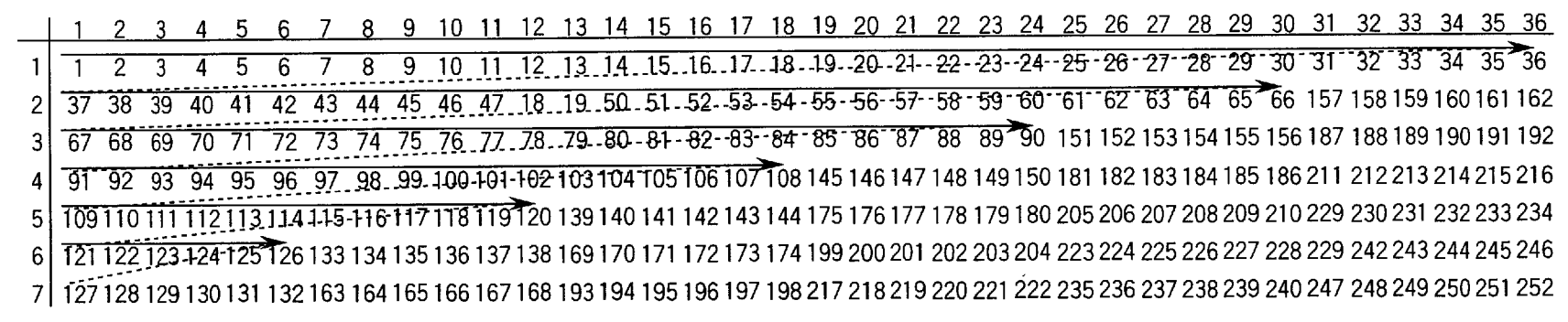

Another preferred embodiment concerning sequences will be described. This embodiment is applied to a printer having very small dots of tone level 1 and having good tone characteristics. In case of such a printer, since an output image has smaller dots than output pixel intervals, with input pixels having tone levels of 0 to 20% of the input highest tone level, unevenness of density and stripes are less conspicuous. Utilizing this, a dither threshold array is determined so that the spatial frequency of an output image is increased, as shown in, for example, FIG. 21A, with respect to an input image having tone levels in that range. FIG. 24 shows one example of the determination.

If a threshold plane sequence shown in FIG. 24 is used and input image data is in a low tone part, the types of diameters of output dots are substantially a few. As the input image data is closer to the middle to high tone parts, the types of diameters of output dots increase.

Thus, the dots in the low tone part which are very important factors for the reproduction of tones in the printer can be made inconspicuous and the types of diameters of dots are increased in the middle to high tone parts in which unevenness of density and stripes tend to be conspicuous, to thereby make unevenness of density and stripes inconspicuous. Further, unlike a case where thresholds are arranged at random, thresholds on the respective planes can be automatically obtained from a reference threshold array because of the correlation among the respective threshold planes, so that simpler hardware configuration can be expected.

Figures 25A, 25B:
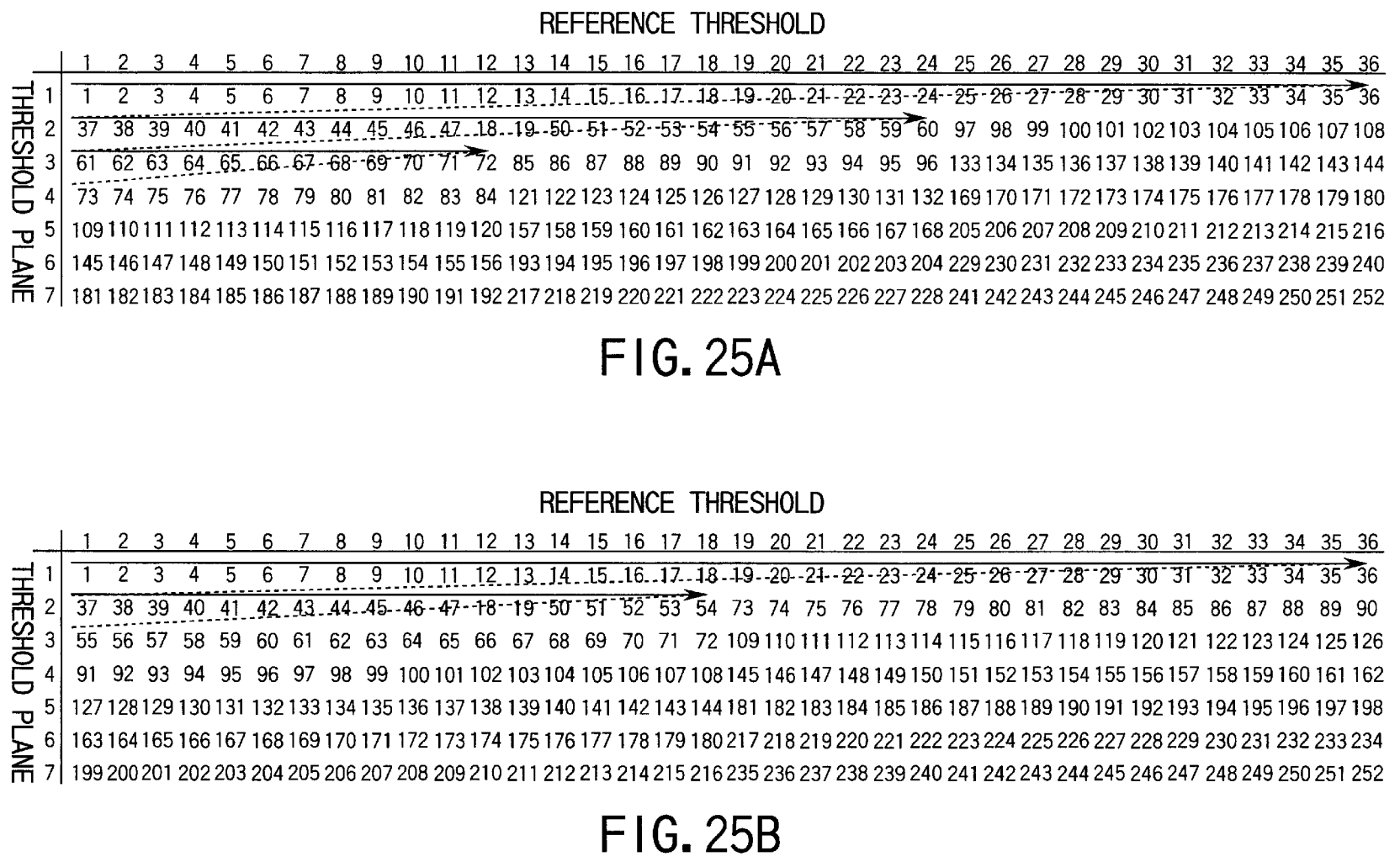

Moreover, the setting of the sequence can be optimized as shown in FIGS. 25A and 25B according to the above principle and according to the basic tone characteristics. The threshold sequence can be more effective if combining the sequence with the optimization of the reference threshold array already described above.

Figure 26A:
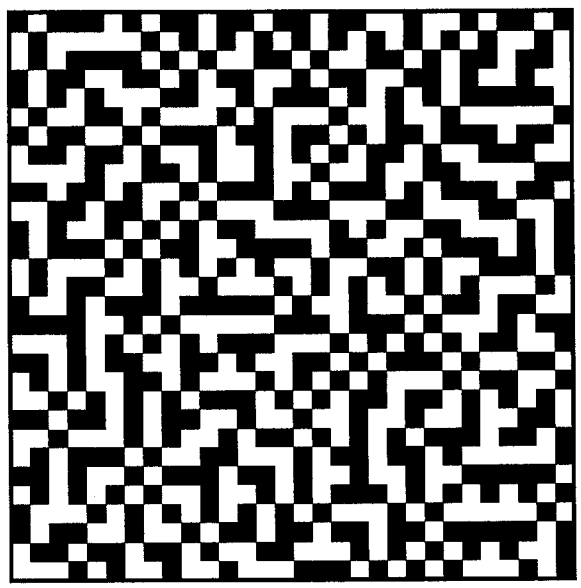
FIGS. 26A and 26B show dots outputted using an isotropic threshold sequence and an anisotropic threshold sequence of the present invention, respectively.
Figure 26B:
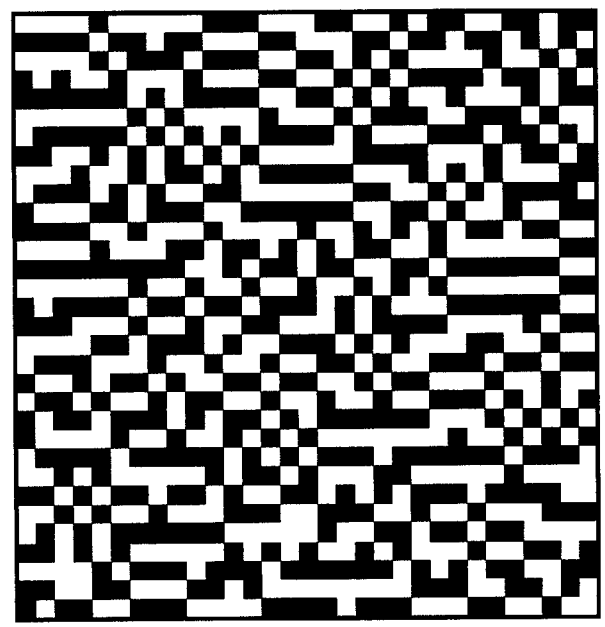

FIG. 26A shows a state n which an image in a middle tone part is output using a normal, periodic, uniformly dispersed reference threshold array. FIG. 26B shows a state in which an image in the middle tone part is output using an anisotropic reference threshold array in which dots are continuous in scan direction in which printing accuracy is relatively low.

FIGS. 27A to 27C show states of output patterns actually printed on a paper sheet using threshold sequences shown in FIGS. 7A to 7C, respectively. Pixels corresponding to portions indicated by dashed line C—C of FIGS. 27A to 27D are shifted right due to the influence of, for example, erroneous direction of ink heads and the like. FIG. 27 shows an output pattern printed by using anisotropic threshold sequences in view of reference threshold array.

Meanwhile, FIG. 27D shows a state of an output pattern in this embodiment. In FIG. 27D, the reference threshold array corresponds to the anisotropic array of FIG. 26B. In case of FIG. 27D, the reference threshold arrays are coupled preferentially in transverse direction. That is, thresholds between adjacent pixels in transverse direction have relatively close values and dots tend to grow transversely.

Thus, a printing error correction effect can be expected to some extent in case of FIG. 27C; however, the output pattern of FIG. 27D can be expected to have a greater correction effect. By configuring the reference threshold array and sequences among the threshold planes so as to obtain an output pattern as shown in FIG. 27D, it is possible to make unevenness of density and stripes less conspicuous even if print position accuracy is low.

As can be seen, according to the first embodiment of the present invention, the low thresholds corresponding to the low threshold range of reference threshold matrix are arranged periodically, orderly to extend over series of sub-matrixes as shown in FIG. 14. As a result, periodic and orderly low tone output dots are outputted to the input image data in the low tone region and the graininess of the low tone part does not deteriorate.

In another embodiment, as shown in FIG. 22, series of low thresholds are arranged to extend over a plurality of dither threshold planes. It is thereby possible to truly reproduce the smooth tone change of the low tone input image.

Furthermore, yet another embodiment is applied to a printer having good tone characteristics in the low tone region. As shown in FIG. 24, the number of planes on which series of low thresholds are arranged is larger than that of the planes on which series of medium and high thresholds are respectively arranged. Therefore, the number of types of sizes of dots outputted when the input image data is in the medium to high tone regions is larger than that when the input image data is in the low tone region. As a result, unevenness of density and stripes become less conspicuous even in the medium to high tone regions in which unevenness of density and stripes tend to be conspicuous.

It is noted that the present invention should not be limited to these embodiments. Namely, it is also possible to prepare plural sets of a plurality of dither threshold planes in advance according to the principles of these threshold arrays and to select a threshold plane set to be used according to the output accuracy of a printer.

Next, description will be given to an embodiment for incorporating gamma correction into a multi-level dither threshold array.

Normally, the theoretical number of tones which a halftone processing can reproduce is determined by the total number of different thresholds in a unit matrix. According to the screen dither method, the intrinsic number of tones determined by a combination of pattern size, screen angle and the like can be reproduced. According to the stochastic dither method and the error diffusion method, 256 tones as many as input tones can be reproduced.

However, this theoretic number of tones indicates the tone reproducibility of the halftone processing section itself. In actuality, there is a possibility that the loss of tone data occurs to the entire portions of the image processing section provided in front of the halftone processing section. Therefore, the image data finally input to the halftone processing section has decreased number of tones, with the result that there exist output tones which are not at all employed in the halftone processing section.

The ordinary image processing is carried out in the order of color conversion→BG/UCR→gamma correction→halftone processing, during which process the loss of tones due to rounding error as a result of digital operation processing, color range compression or the like, occurs.

While tone loss in the color conversion section and the UCR section is basically not restorable, the reproduction of tones in the gamma correction section and the halftone processing section will be described hereinafter.

Figure 28:
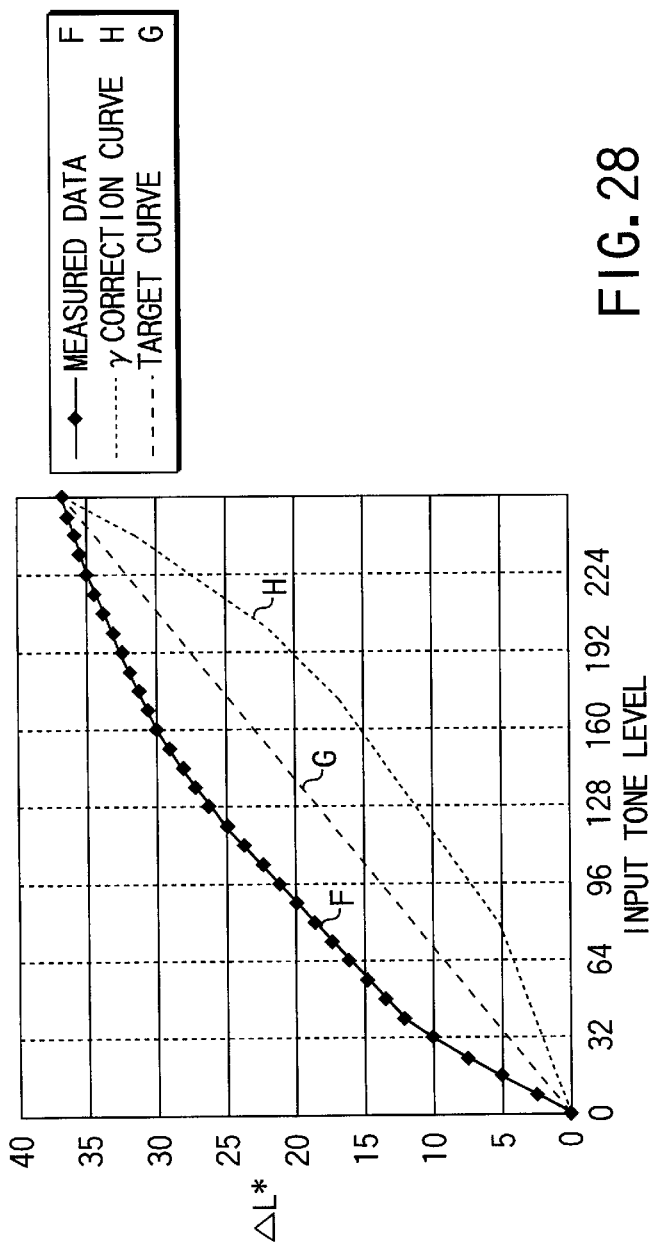
FIG. 28 is an explanatory view for gamma characteristics and gamma correction.

The gamma correction is a processing to correct the tone characteristics of the printer engine to target characteristics linear to either brightness or density. FIG. 28 is an explanatory view for the gamma correction. In FIG. 28, the horizontal axis represent input tone level and the vertical axis represents brightness ΔL*. A curve F indicates the measured basic tone characteristics of the printer engine. The brightness ΔL* indicates the difference between the brightness of measurement target input tone level and that of input tone level 0. Therefore, the higher value of the brightness ΔL* means that the image is darker.

Using the tone characteristics F, a gamma correction curve H symmetric to the target characteristics G is obtained. Using, in turn, the gamma correction curve H, the input image data is converted, whereby the tone characteristics is corrected to target characteristics. For example, the input tone level "64" is corrected to a tone level "32" and the input tone level "32", is corrected to a tone level "20" by this gamma correction. Although the target curve is straight in FIG. 28, it may be replaced by an arbitrary curve.

As shown in FIG. 28, the basic tone characteristics F of the output apparatus for expressing dots in the form of a circle and conducting area modulation appears as a curve above the target characteristics G. Actual gamma γ correction is, in many cases, carried out by digital 1 (one-dimension) LUT operation for the respective colors.

Figure 29:
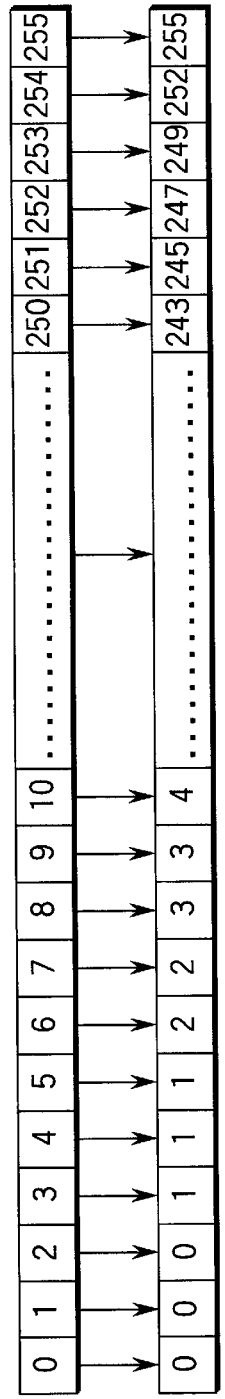
FIG. 29 shows gamma conversion by ordinary table conversion.

In FIG. 28, the digital 1 LUT operation conducts conversion operation which is specifically shown in FIG. 29. In the low tone part, a plurality of different values (e.g., 0, 1 and 2) are converted into an equal value (0) due to digital rounding error. In the high tone part, continuous values (e.g., 250 and 251) are converted into sporadic values (243 and 245).

That is to say, in the low tone part which is important for tone reproduction, even if input tone levels are different, output dots tend to have the same pattern and dot patterns which are not used (e.g., 244) in the high tone part exist. As a result, the number of reproduced tones decreases and image processing conversion accuracy is lowered. According to this phenomenon, if the basic tone characteristics of the printer engine is farther from the target characteristics, digital conversion efficiency becomes lower and the number of reproduced tones greatly decreases. Speaking of an ink jet printer, however, its characteristics is relatively close to ideal one.

Based on the above, therefore, in this embodiment, gamma correction is incorporated in the halftone processing and a matrix for theoretically suppressing tone loss is created. As for the binary dither processing, a dither threshold generation method including therein gamma correction is well-known. In case of a multi-level dither processing, however, tone characteristics among the planes are not linear. Due to this, although the conventional method is applicable to sequences among limited threshold planes, it is normally difficult to apply the method thereto.

For example, if one pixel has 8 levels, matrix size is 32×32 and the number of output tones is 8 (7 threshold planes), then the number of dots on which ON/OFF states of output pixels are changed, i.e., the number of the same thresholds on 7 threshold planes is 32×32×(8-1)/255≈28 as the tone level of and input image (image of uniform tone level) is incremented by "one". "OFF output pixel" indicates a state in which input tone data is not more than a threshold in a threshold plane. "ON output pixel" indicates a state in which input tone data is greater than arbitrary dither threshold plane. The number of ONs indicates the number of order of the threshold plane which the input data exceeds, it is 7 at most. In normal halftone processing, the same thresholds are uniformly allotted to the tones. For example, if the number of the same thresholds is 28, then the number of same thresholds allotted per plane is 28.

The basic principle of this embodiment is that gamma conversion characteristics are incorporated into thresholds on all threshold planes determining whether output pixels are turned ON or OFF in the halftone processing. Specifically, among the thresholds arranged on a plurality of threshold planes, the number of same thresholds for turning output pixels ON is determined according to the gamma characteristics every time the tone level of the input image of same tone level is incremented by "1". That is, the gamma correction section of the digital conversion which may cause tone loss is not employed but a gamma processing is employed only for adjusting the number of ON output pixels to the respective input tone levels. As a result, the input tone level is truly restored.

Figures 30A, 30B:
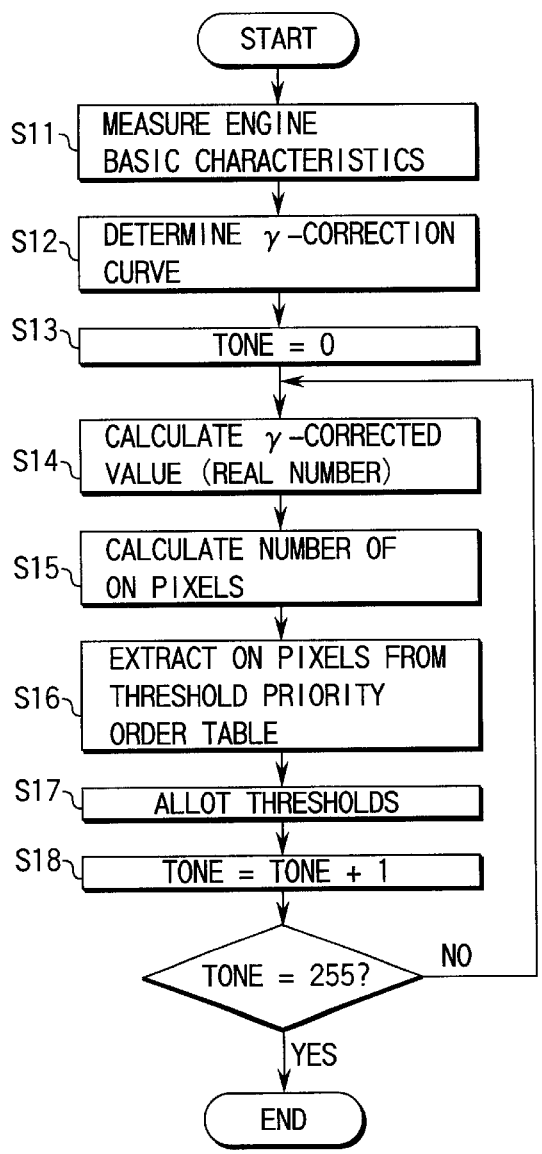
FIGS. 30A and 30B are a flow chart and a table for determining dither thresholds among entire threshold planes, into which gamma correction is incorporated, according to the present invention.

A method of calculating a multi-level dither threshold array into which this gamma correction is incorporated will be described with reference to FIGS. 30A, 30B and 28. FIG. 30A is a flow chart showing this calculation method. First, in a step S11, using a multi-level dither matrix in which the number of thresholds is uniformly allotted to respective planes, the basic tone characteristics (see curve F of FIG. 28) of the printer engine is measured. Next, in a step S12, a target curve G is determined. In a step S13, the tone is set at 0.

Next, in a step S14, as in the case of normal gamma conversion, a gamma-corrected tone level is calculated from each of the input tone levels referring to the gamma target curve H. At this moment, the gamma-corrected tone level is calculated not as an integer but as an actual number (including values down to a decimal point). As shown in FIG. 30B, for example, a gamma-corrected tone level is calculated as "0.6" from input tone level "1" or as "1.5" from input tone level "3".

Thereafter, in a step S15, from the gamma-corrected tone level thus calculated, the number of ON pixels (ON number) which increases every time the input tone level is incremented by one is calculated as shown in FIG. 30B. In case of a multi-level dither processing while the input tone level is "256" and 7 planes of 32×32 matrixes are employed, the value of ON number is normally 28. Accordingly, as the input tone level is incremented by one, 28 output pixels are turned ON among thresholds of 32×32×7 on the 7 planes.

According to the present invention, however, the number of ON pixels is determined according to the gamma-corrected tone level calculated in the step S14 as shown in FIG. 30B. To simplify description, FIG. 30B shows a case where the normally, uniformly allotted number (28 in the above example) is "4". For example, if the gamma-corrected tone level is "0.6" while the input tone level is "1" in the step S14, the number of ON pixels (ON number) is 4×0.6=2.4≈2. If the gamma-corrected tone level is "1" while the input tone level is "1", the number of ON pixels is 4×1=4.

Next, in a step S16, ON pixels are extracted from a threshold priority order table. This threshold priority order table shows, as will be described in detail later, orders of priority given to all thresholds included in, for example, 7 threshold planes of 32×32 matrix. Which priority order is given to which threshold on which plane is determined according to the threshold sequence algorithm which has been described in the preceding embodiment of the present invention.

In a step S17, in accordance with the number of dots to be turned ON obtained in the step S15, multi-level dither thresholds are allotted to the threshold sections on all threshold planes in the order of low to high priority orders. In the above case, for example, since the number of ON pixels is 16 with the input tone level of "1", the matrix threshold of the priority orders 1 to 16 is determined as "1". In a step S18, the tone is incremented by one. Then, the processing from steps S14 to S18 are repeatedly carried out throughout the tones, whereby all thresholds can be filled in all threshold planes.

FIGS. 31A to 31C show a threshold allotting method in this embodiment. In FIGS. 31A to 31C, to simplify description, it is assumed that reference thresholds are up to 4 and the number of threshold planes is 3. Reference symbol 107 denotes a sequence of thresholds extending over a plurality of threshold planes. Reference symbol 108 denotes orders of priority of thresholds arranged on each threshold plane. The priority orders can be determined by, for example, conducting the above-stated convolution filtering operation. Reference symbol 109 denotes a conventional reference threshold array obtained by uniformly allotting the reference thresholds 1 to 4, i.e., four reference thresholds 1 to 4. FIG. 31B shows that orders of priority are allotted to all thresholds on the three planes based on the priority orders shown in FIG. 31A.

As shown in, for example, reference 107 of FIG. 31A, threshold 1 is a reference threshold 1 on the first threshold plane. In case of FIG. 30B, therefore, orders of priority of four portions in reference symbol 110 of FIG. 31B indicated by "1" of reference symbol 109 in FIG. 31A are determined as 1, 2, 3 and 4 according to orders "1, 2, 3 and 4", shown in reference symbol 108. Next, threshold 2 corresponds to a reference threshold 1 on the second plane as shown in reference symbol 107 of FIG. 31A. Accordingly, as in the case of the above, orders of priority of four portions on the second plane are determined as 5, 6, 7 and 8 as shown in reference symbol 111 in FIG. 27B. In this way, orders of priority of all thresholds on the entire planes are determined.

According to orders of priority of all thresholds, the thresholds are determined by the ON number of input tone levels calculated as shown in FIG. 30B. For example, as shown in reference symbol 113 of FIG. 31C, two thresholds 1 on the first plane are determined first. Then, four thresholds 2 on the first planes are determined as shown in reference symbols 113 of FIG. 31C. In this way, no matter how complicated the sequences among the threshold planes may be, all thresholds on all threshold planes are determined on uniqueness basis.

It is noted that if a periodic pattern is output in the low tone part, the orders of priority are determined according to rule of the ordered dither processing. For example, orders of priority are determined for all blank portions but the low threshold part shown in FIG. 14A, and middle and high thresholds are determined according to the priority orders.

In the above-stated embodiment, the reference threshold array and the sequences among the threshold planes are appropriately combined, whereby it is possible to incorporate gamma correction into the multi-level dither thresholds and to, therefore, obtain an image of higher tone reproducibility.

The above embodiment basically concerns a threshold sequence for a single color such as black. It is easy to expand this method to a color image. In that case, however, it is required to consider how output dots of the respective colors are superposed on others.

In case of a color image, a multi-level dither processing is normally carried out for each color. Now, consideration will be given to a case where a dither processing is conducted to at least two colors while employing threshold planes having the threshold arrays described in the above embodiment.

Some colors are not required to use the reference threshold array in the embodiment. For example, as for Yellow which is a color which dot grains are quite inconspicuous visually, the reference threshold array in the above-stated embodiment is not employed but a simple, conventional dither threshold array may be employed. As for Black which is a color the edge of which is desired to be more emphasized, a multi-level error diffusion processing is employed so as to enhance an edge effect.

On the other hand, if exactly the same threshold pattern is applied to all colors to which the above-stated processing is conducted, the pattern is a Dot-On-Dot output pattern, i.e., a pattern on which dots are superposed is provided. Accordingly, if dot print positions are slipped due to the variation of printer output characteristics and the like, unevenness of colors may disadvantageously occur. It is, therefore, necessary to use different reference threshold arrays for the respective colors. To realize this, reference threshold arrays may be created for the respective colors individually; however, it is easier to create them by operations such as the inversion, rotation or shift of the reference threshold array created once.

Normally, a printer which outputs two levels per color is required to be designed more strictly in view of color moire depending on the correlation of dots of respective colors. In case of a multi-level printer, by contrast, color moire due to the combination of patterns of the respective colors occurs less frequently, so that a highly accurate image can be expected to be obtained by the relatively simple operation of changing thresholds. Further, in case of the multi-level output printer which inherently has threshold arrays of high dot dispersibility for the respective tones, a simple threshold operation will suffice. If an image is to be reproduced while employing periodically ordered dither for a low tone part thereof, output patterns having quite high periodicity are provided for the corresponding tone part. For that reason, it is required to appropriately design thresholds in view of color interference.

Figure 32:
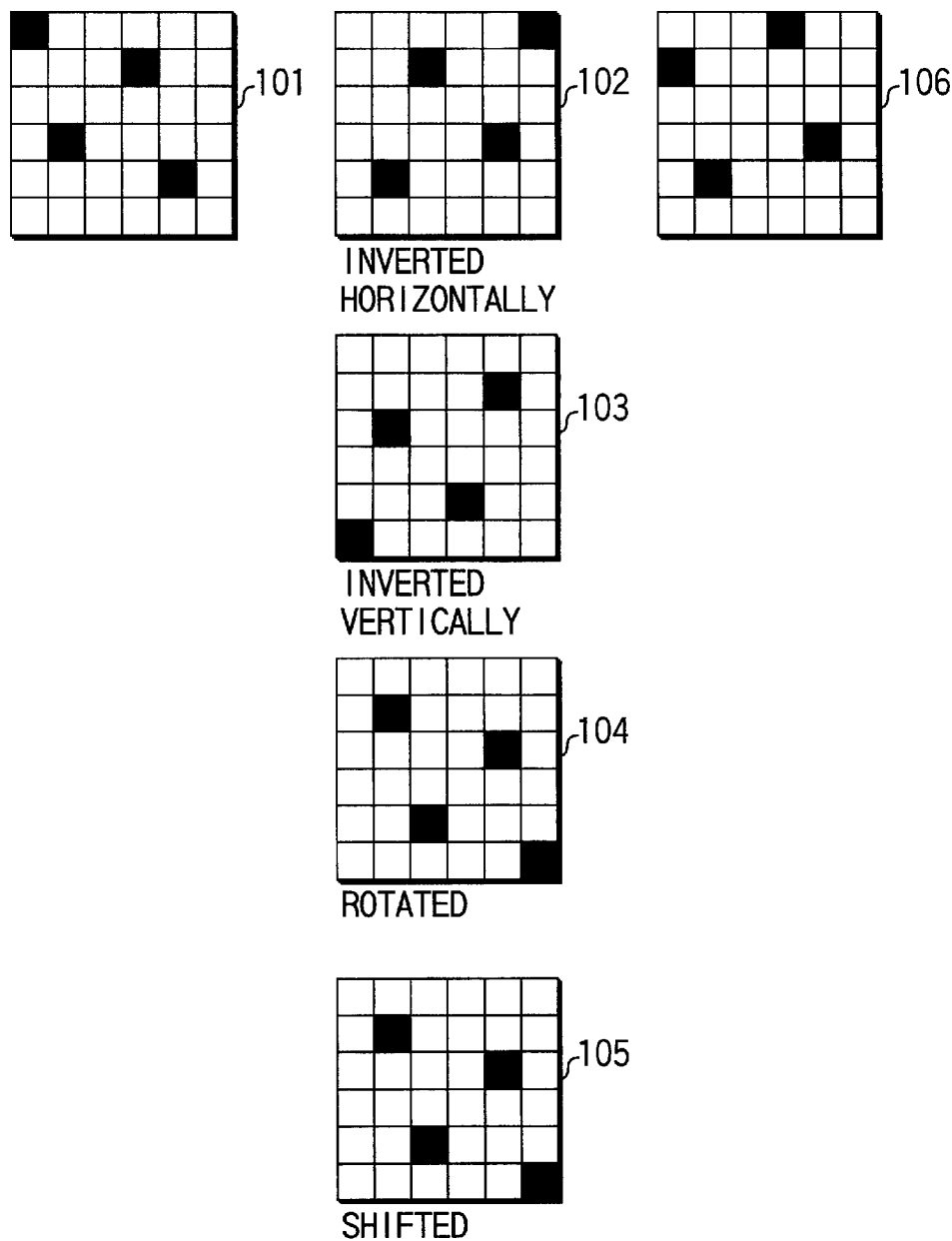
FIG. 32 shows dot arrangement relationship in low tone parts among respective colors according to the present invention.
Figure 33:
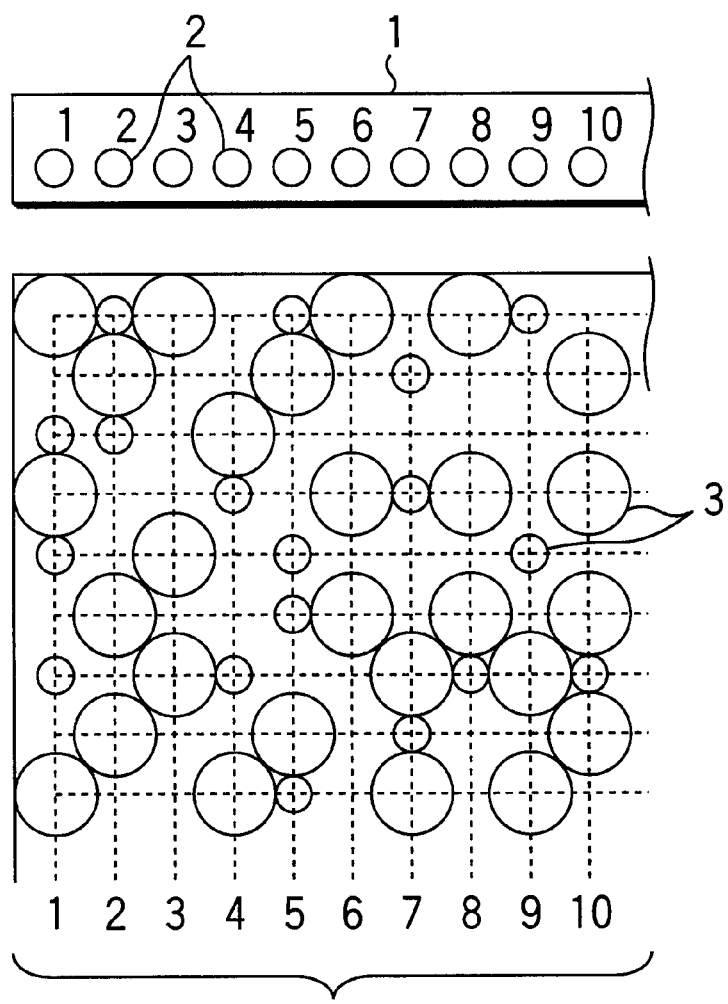
FIG. 33 shows a line recording head and a printing example by the line recording head.
Figure 34:
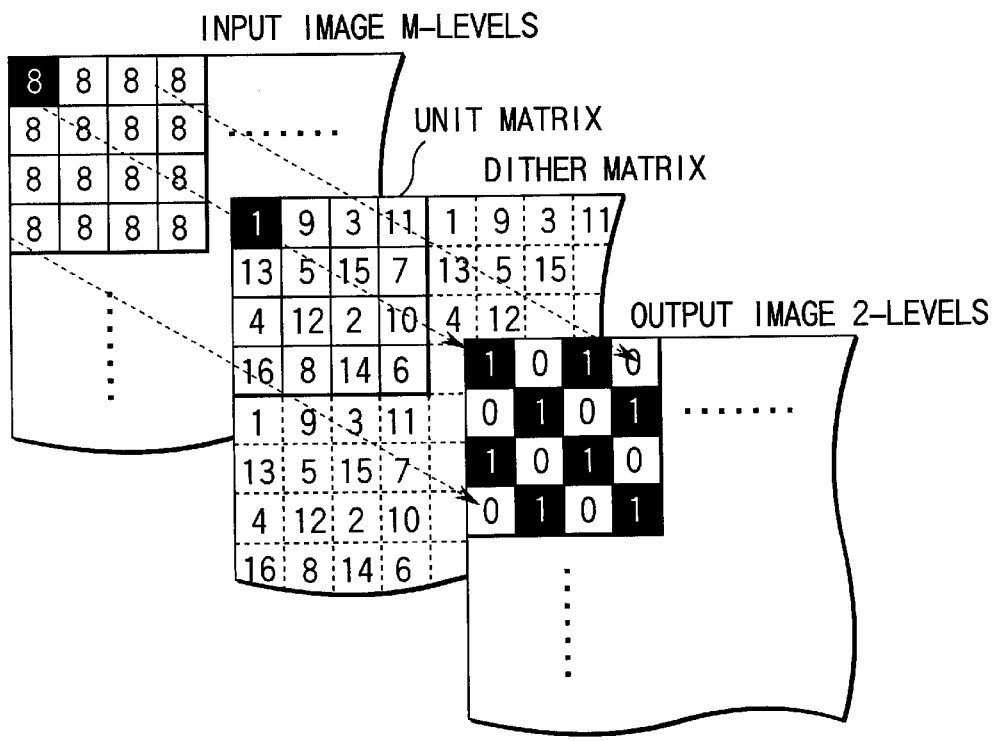
FIG. 34 shows an algorithm for a binary dither processing.
Figure 35:
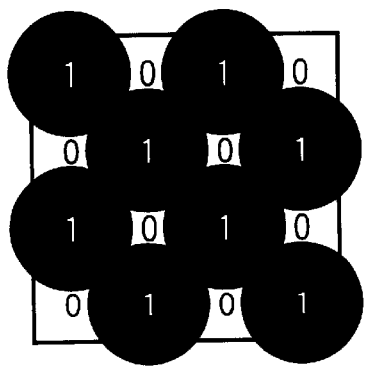
FIG. 35 shows a print output example by the binary dither processing of FIG. 34.
Figure 36:
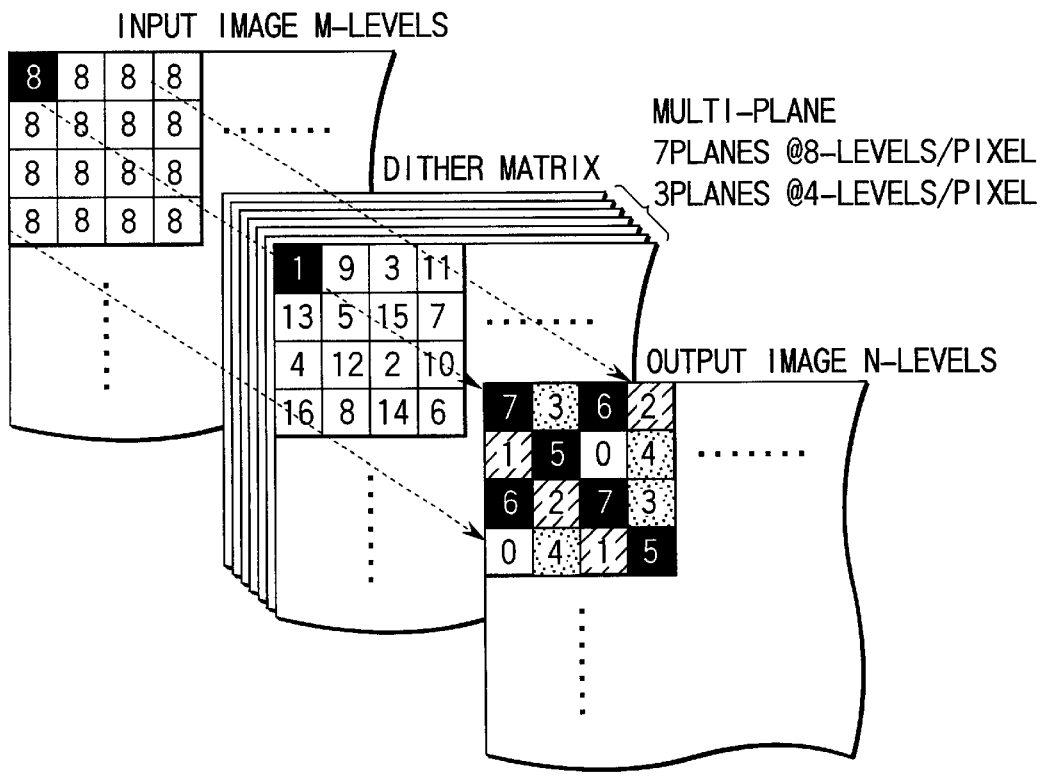
FIG. 36 shows an algorithm for a multi-level dither processing.
Figure 37:
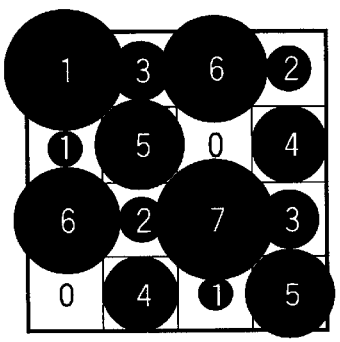
FIG. 37 shows a print output example by the multi-level dither processing of FIG. 36.

As one preferred example of the simple threshold operation, thresholds may be allotted to sub-matrixes or minimum dither units by conducting operation such as inversion, rotation or shift as shown in FIG. 32 to rearrange the thresholds. In FIG. 32, reference symbol 101 denotes a low threshold array which is designed first. Reference symbol 102 denotes an array obtained by inverting the array of reference symbol 101 horizontally. Reference symbol 103 denotes an array obtained by inverting the array of reference symbol 101 vertically. Reference symbol 104 denotes an array obtained by rotating the array of reference symbol 101 and reference symbol 105 denotes an array obtained by shifting the array of reference symbol 101. Alternatively, as indicated by an array denoted by reference symbol 106, a completely different pattern is created and thresholds on all matrixes are recreated based on this newly created reference threshold pattern for different colors. At this moment, in the low tone patterns of the respective colors, it is preferable that dots are not superposed at the same position but arranged away from one another as far as possible as shown in FIG. 32. This is because a dot superposed portion substantially becomes a secondary color to make the existence of dots more conspicuous visually. Also, this is because superposed dots make periodicity provided with this tone part, more conspicuous.

Meanwhile, as for sequences among threshold planes in respect of colors, it is possible to easily realize the optimum settings of sequences for the respective colors according to the actual printing accuracies for the respective colors. This is because multi-level dither processing are independently conducted for the respective colors.

Further, even if printing accuracy is statistically the same, it is known that the influence of unevenness of density and stripes on visibility normally differs greatly according to colors. For example, with the same printing accuracy, colors in the order of Y→C→M→K are more conspicuous as noise to human eyes. Considering this, sequences among threshold planes are appropriately changed according to colors and halftoning is conducted in the multi-level dither processing for the respective colors, thereby making it possible to obtain a more appropriate output image.

While description has been given to four colors of CMYK, the change of sequences is not limited to four colors and it can be easily realized by three colors of CMY or a combination of other colors. Further, while description has been given to the multi-level dither processing, most of the processing may be easily applicable to a binary dither processing except for that limited to multiple levels such as the setting of sequences among threshold planes.

While the above embodiments have been described while taking, as an example, a case of applying the present invention to the multi-level dither processing, the present invention should not be construed to be limited thereto. Those having ordinary skill in the art could easily apply the present invention to a dot pattern method and the like. That is, the multi-level dither processing method and dot pattern method basically, only differ in correspondence as follows. According to the multi-level dither processing, the input image data and the dither thresholds have one-by-one relationship and the input image data and the finally outputted image data have one-by-one relationship. On the other hand, according to the dot pattern method, while input image data and conversion thresholds have 1:K (K>2) correspondence, input image data and finally outputted image data have 1:K (K>2) relationship. Needless to say, K can be extended in both of or either of scan and sub-scan directions.

The embodiments of the present invention have been described while taking a case of employing a printer as image output means as an example. The image output means should not be, however, limited to the printer. A display unit such as a CRT display and a liquid crystal display, may be used as the image output means.

As stated above, the present invention can realize a halftone processing which improves the graininess of a halftone-processed image, which has excellent tone reproduction characteristics and which is suited for a photographic image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processor for converting input image data having a first number of tones into image data having a second number of tones lower than said first number by a halftone processing, and for outputting an image corresponding to the image data, said image processor comprising:

halftone processing means for carrying out the halftone processing using a dither threshold plane on which thresholds in a predetermined threshold range corresponding to a tone range of said input image data are arranged on said dither threshold plane, and for providing halftone-processed image data; and image output means having intrinsic, basic tone characteristics, for outputting an image corresponding to said halftone-processed image data provided from said halftone processing means, wherein said dither threshold plane includes a plurality of unit threshold matrixes of same size; each of said unit threshold matrix includes a plurality of sub-matrixes; an array of relatively low thresholds in said predetermined threshold range of a reference threshold for determining thresholds of the unit threshold matrix is equal among the plurality of sub-matrixes; and relatively medium thresholds and high thresholds in said predetermined threshold range are arranged aperiodically to extend over series of sub-matrixes.

2. An image processor according to claim 1, wherein said image output means has different output position accuracies between a main scan direction and a sub-scan direction; an array of said medium thresholds and high thresholds is an anisotropic array having neighboring thresholds in a direction coincident with a scan direction in which the output position accuracy is relatively low, having close values, whereby said image output means outputs an image having medium and high threshold dots arranged serially in the scan direction.

3. An image processor according to claim 1, wherein said low thresholds are arranged to be away from one another by at least not less than three elements in horizontal and perpendicular directions.

4. An image processor according to claim 1, wherein said low thresholds are arranged to be away from one another by at least not less than three elements in horizontal and perpendicular directions and to be away from one another by at least not less than two elements in four directions at 45 degrees from the horizontal direction.

5. An image processor according to claim 1, wherein said medium threshold and high threshold array is deduced from an approximation calculation model imitating output characteristics of said image output means.

6. An image processor according to claim 1, wherein said medium threshold and high threshold array is set at random in said unit threshold matrix.

7. An image processor according to claim 2, wherein said anisotropic medium threshold and high threshold array is set to have high anisotropy when a difference in said output position accuracy of said image output means between the main scan direction and the sub-scan direction is large and to have low anisotropy when the difference in said output position accuracy is small.

8. An image processor according to claim 1, wherein said conversion means conducts an image conversion processing using a plurality of other threshold arrays generated to be correlated with said reference threshold array as well as said reference threshold array.

9. An image processor according to claim 1, wherein a ratio of the number of elements of said low thresholds is not more than 20% of an entire element number of said threshold plane and determined according to said basic tone characteristics.

10. An image processor for converting input image data having a first number of tones into image data having a second number of tones lower than said first number by a halftone processing, and for outputting an image corresponding to the image data, said image processor comprising:

halftone processing means for carrying out the halftone processing using a plurality of dither threshold planes on which thresholds in a predetermined threshold range corresponding to a tone range of said input image data are arranged on said plurality of dither threshold planes, and for providing halftone-processed image data, each of the plurality of dither threshold planes including a plurality of same unit threshold matrixes; and image output means having intrinsic, basic tone characteristics, for outputting an image corresponding to said halftone-processed image data provided from said halftone processing means, wherein each of said unit threshold matrixes includes a plurality of sub-matrixes on not less than one dither threshold plane; an array of relatively low thresholds in said predetermined threshold range is equal among said plurality of sub-matrixes; and relatively medium and high thresholds in said predetermined threshold range are arranged aperiodically to extend over series of sub-matrixes.

11. An image processor according to claim 10, wherein said relatively low thresholds are not more than 10% of a maximum threshold in said predetermined threshold range and determined according to said basic tone characteristics.

12. An image processor according to claim 10, wherein a threshold array of the plurality of dither threshold planes is set based on said basic tone characteristics of said image output means.

13. An image processor according to claim 10, wherein a threshold array extending over a plurality of threshold planes is determined based on the output position accuracy of said image output means.

14. An image processor for converting input image data having M tones per pixel into image data having N tones for K pixels by a halftone processing, and for outputting an image corresponding to the image data, K set not more than 2 and N set not more than 2, said image processor comprising:

image conversion means for converting said input image data by the halftone processing using a reference threshold array, and for providing the halftone-processed image data; and image output means having intrinsic, basic tone characteristics, for outputting an image corresponding to said halftone-processed image data provided from said image conversion means, wherein said reference threshold array includes a plurality of unit threshold matrixes of same size; an array of relatively low thresholds in a threshold range of the reference thresholds for determining thresholds of the unit threshold matrix is a periodic array in the unit threshold matrix; and an array of relatively medium thresholds and high thresholds is an aperiodic array in the unit threshold matrix.

15. An image processor according to claim 14, wherein said image output means has different output position accuracies between a main scan direction and a sub-scan direction; an array of said medium thresholds and high thresholds is an anisotropic array having neighboring thresholds in a direction coincident with a scan direction in which the output position accuracy is relatively low, having close values, whereby said image output means outputs an image having medium and high threshold dots arranged serially in the scan direction.

16. An image processor according to claim 14, wherein said low thresholds are arranged to be away from one another by at least not less than three elements in horizontal and perpendicular directions.

17. An image processor according to claim 14, wherein said low thresholds are arranged to be away from one another by at least not less than three elements in horizontal and perpendicular directions and to be away from one another by at least not less than two elements in four directions at 45 degrees from the horizontal direction.

18. An image processor according to claim 14, wherein said medium threshold and high threshold array is deduced from an approximation calculation model imitating output characteristics of said image output means.

19. An image processor according to claim 14, wherein said medium threshold and high threshold array is set at random in said unit threshold matrix.

20. An image processor according to claim 15, wherein said anisotropic medium threshold and high threshold array is set to have high anisotropy when a difference in said output position accuracy of said image output means between the main scan direction and the sub-scan direction is large and to have low anisotropy when the difference in said output position accuracy is small.

21. An image processor according to claim 14, wherein said conversion means conducts an image conversion processing using a plurality of other threshold arrays generated to be correlated with said reference threshold array as well as said reference threshold array.

22. An image processor according to claim 14, wherein a ratio of the number of elements of said low thresholds is not more than 20% of an entire element number of said plurality of threshold planes and determined according to said basic tone characteristics.

23. An image processor for converting color input image data having a first number of tones into color image data having a second number of tones lower than said first number by a halftone processing, and for outputting a color image corresponding to the image data, said image processor comprising:

halftone processing means for carrying out the halftone processing using a dither threshold plane for each color, and for providing said halftone-processed image data, said dither threshold plane including a plurality of unit threshold matrixes of same size; and image output means having intrinsic, basic tone characteristics, for outputting a color image corresponding to said halftone-processed image data provided from said halftone processing means, wherein for at least two color components, each of said unit threshold matrixes includes a plurality of sub-matrixes, an array of relatively low thresholds in a threshold range of reference thresholds for determining thresholds of the unit matrix is equal among said plurality of sub-matrixes, and relatively medium and high thresholds in said predetermined threshold range are arranged aperiodically to extend over series of sub-matrixes.

24. An image processor according to claim 23, wherein said image output means has different output position accuracies between a main scan direction and a sub-scan direction; an array of said medium thresholds and high thresholds is an anisotropic array having neighboring thresholds in a direction coincident with a scan direction in which the output position accuracy is relatively low, having close values, whereby said image output means outputs an image having medium and high threshold dots arranged serially in the scan direction.

25. An image processor according to claim 23, wherein said reference threshold array is a reference threshold array obtained by a calculation for at least one type of color component in advance and converted by one of inversion, rotation and shift processing for remaining color components.

26. An image processor according to claim 25, wherein in the sub-threshold matrix of said reference threshold array, a relatively low threshold array in said threshold range differs according to colors, whereby said image output means does not output low tone dots of different colors at a same position.

27. An image processor according to claim 23, wherein said halftone processing means conducts a multi-level dither processing using a threshold array extending over a plurality of dither threshold planes; said unit threshold matrix on at least one of said plurality of dither threshold planes includes a plurality of sub-matrixes; a relatively low threshold array in a predetermined threshold range corresponding to an entire tone range of said input image data is equal among said plurality of sub-matrixes.

28. An image processor according to claim 23, wherein said halftone processing means conducts the halftone processing using a threshold array extending over a plurality of dither threshold planes for each color component; serial thresholds of relatively low thresholds, medium thresholds and high thresholds in a predetermined threshold range corresponding to an entire tone range of said input image data are arranged to extend over at least one of said threshold planes, respectively, for each color component; threshold planes having the low thresholds arranged are fewer than threshold planes having said medium and high thresholds arranged, respectively, whereby said image output means has more sizes of dots outputted when the input image data is in medium and high tone ranges than sizes of dots outputted when the input image data is in a low tone range.

29. An image processor according to claim 23, wherein said halftone processing means conducts a multi-level dither processing using a threshold array extending over a plurality of dither threshold planes, the plurality of dither threshold planes each comprising:
a first plurality of dither threshold planes on which said unit threshold matrix includes a plurality of sub-matrixes and a relatively low threshold array in a predetermined threshold range corresponding to an entire tone range of said input image data is equal among said plurality of sub-matrixes for not less than one dither plane; and
a second plurality of dither threshold planes on which serial thresholds of relatively low thresholds, medium thresholds and high thresholds in said predetermined threshold range are arranged to extend over not less than one said threshold plane, respectively, threshold planes having the low thresholds arranged are fewer than the threshold planes having the medium thresholds and the high thresholds arranged, respectively, wherein
said halftone processing means conducts the halftone processing using one of said first and second plurality of dither threshold planes according to the output position accuracy of said image output means.

30. An image processor according to claim 23, wherein said halftone processing means conducts a multi-level dither processing using a threshold array extending over a plurality of dither threshold planes, the plurality of dither threshold planes each comprising:
a first plurality of dither threshold planes on which said unit threshold matrix includes a plurality of sub-matrixes and a relatively low threshold array in a predetermined threshold range corresponding to an entire tone range of said input image data is equal among said plurality of sub-matrixes for not less than one threshold plane; and
a second plurality of dither threshold planes on which serial thresholds of relatively low thresholds, medium thresholds and high thresholds in said predetermined threshold range are arranged to extend over not less than one said threshold plane, respectively, threshold planes having the low thresholds arranged are fewer than the threshold planes having the medium thresholds and the high thresholds arranged, respectively, wherein
said halftone processing means conducts the halftone processing using one of said first and second plurality of dither planes according to an input color component.

31. An image processor for converting color input image data having a first number of tones into image data having a second number of tones lower than said first number by a halftone processing, and for outputting an image corresponding to the image data, said image processor comprising:
halftone processing means for halftone-processing the input image data using a dither threshold plane, and for providing the halftone-processed image data; and
image output means having intrinsic, basic tone characteristics, for outputting an image corresponding to said halftone-processed image data provided from said halftone processing means, wherein
said dither threshold plane includes a plurality of unit threshold matrixes of same size; each of the plurality of unit threshold matrixes includes a plurality of sub-matrixes; a relatively low threshold array in a threshold range of reference thresholds for determining the unit threshold matrix is equal among said plurality of sub-matrixes and an array of relatively medium to high thresholds in said threshold range is an aperiodic array over said plurality of sub-matrixes for at least two types of color components; and a threshold array for color components other than said two color components is a periodic and ordered array in said unit threshold matrix in an entire threshold range.

32. An image processor according to claim 31, wherein said image output means has different output position accuracies between a main scan direction and a sub-scan direction; an array of said medium thresholds and high thresholds is an anisotropic array having neighboring thresholds in a direction coincident with a scan direction in which the output position accuracy is relatively low, having close values, whereby said image output means outputs an image having medium and high threshold dots arranged serially in the scan direction.

33. An image processor for converting color input image data having a first number of tones into image data of a second number of tones lower than said first number by a halftone processing, and for outputting an image corresponding to the image data, said image processor comprising:

halftone processing means for halftone-processing the input image data using a dither threshold plane, and for providing the halftone-processed image data; and image output means having intrinsic, basic tone characteristics, for outputting an image corresponding to said halftone-processed image data provided from said halftone processing means, wherein said dither threshold plane includes a plurality of unit threshold matrixes of same size; each of the plurality of unit threshold matrixes includes a plurality of sub-matrixes; a relatively low threshold array in a threshold range of reference thresholds for determining the unit threshold matrix is equal among said plurality of sub-matrixes and an array of relatively medium to high thresholds in said threshold range is an aperiodic array over said plurality of sub-matrixes for at least two types of color components, wherein said halftone processing means carries out the halftone processing using said threshold array for said at least two types of color components, and carries out the halftone processing based on an error diffusion processing for color components other than said two color components.

34. An image processor according to claim 33, wherein said image output means has different output position accuracies between a main scan direction and a sub-scan direction; an array of said medium thresholds and high thresholds is an anisotropic array having neighboring thresholds in a direction coincident with a scan direction in which the output position accuracy is relatively low, having close values, whereby said image output means outputs an image having medium and high threshold dots arranged serially in the scan direction.

* * * * *